United States Patent
Hoffman et al.

(10) Patent No.: US 9,592,604 B2
(45) Date of Patent: Mar. 14, 2017

(54) REMOTELY OPERATING A MOBILE ROBOT

(71) Applicant: iRobot Corporation, Bedford, MA (US)

(72) Inventors: Orin P. F. Hoffman, Somerville, MA (US); Peter Keefe, Freemont, NH (US); Eric Smith, Stow, MA (US); John Wang, Andover, MA (US); Andrew Labrecque, Maynard, MA (US); Brett Ponsler, Worcester, MA (US); Susan Macchia, Chelmsford, MA (US); Brian J. Madge, Charlestown, MA (US)

(73) Assignee: IROBOT DEFENSE HOLDINGS, INC., Bedford, MA (US)

( * ) Notice: Subject to any disclaimer, the term of this patent is extended or adjusted under 35 U.S.C. 154(b) by 0 days.

(21) Appl. No.: 15/069,523

(22) Filed: Mar. 14, 2016

(65) Prior Publication Data

US 2016/0243698 A1     Aug. 25, 2016

Related U.S. Application Data

(62) Division of application No. 14/507,653, filed on Oct. 6, 2014, now Pat. No. 9,283,674.

(Continued)

(51) Int. Cl.
*G05B 19/04* (2006.01)
*B25J 9/16* (2006.01)
(Continued)

(52) U.S. Cl.
CPC ............... *B25J 9/161* (2013.01); *B25J 5/005* (2013.01); *B25J 5/007* (2013.01); *B25J 9/1671* (2013.01);
(Continued)

(58) Field of Classification Search
CPC . B25J 5/005; B25J 5/007; B25J 9/1671; B25J 9/1689
See application file for complete search history.

(56) References Cited

U.S. PATENT DOCUMENTS

| 4,794,534 A | 12/1988 | Millheim |
| 5,179,843 A | 1/1993 | Cohausz |

(Continued)

OTHER PUBLICATIONS

Issue Notification for U.S. Appl. No. 14/507,653 (Feb. 24, 2016).
(Continued)

*Primary Examiner* — Ian Jen
(74) *Attorney, Agent, or Firm* — Jenkins, Wilson, Taylor & Hunt, P.A.

(57) ABSTRACT

A method of operating a robot includes electronically receiving images and augmenting the images by overlaying a representation of the robot on the images. The robot representation includes user-selectable portions. The method includes electronically displaying the augmented images and receiving an indication of a selection of at least one user-selectable portion of the robot representation. The method also includes electronically displaying an intent to command the selected at least one user-selectable portion of the robot representation, receiving an input representative of a user interaction with at least one user-selectable portion, and issuing a command to the robot based on the user interaction.

22 Claims, 26 Drawing Sheets

Related U.S. Application Data

(60) Provisional application No. 61/924,433, filed on Jan. 7, 2014.

(51) Int. Cl.

| | | |
|---|---|---|
| *B25J 19/02* | (2006.01) | |
| *B25J 5/00* | (2006.01) | |
| *B25J 13/00* | (2006.01) | |
| *B25J 13/02* | (2006.01) | |
| *B25J 13/06* | (2006.01) | |
| *G05D 1/00* | (2006.01) | |

(52) U.S. Cl.
CPC .......... *B25J 9/1689* (2013.01); *B25J 9/1697* (2013.01); *B25J 13/006* (2013.01); *B25J 13/025* (2013.01); *B25J 13/06* (2013.01); *B25J 19/021* (2013.01); *G05D 1/0038* (2013.01); *G05B 2219/39449* (2013.01); *G05B 2219/39451* (2013.01); *G05D 2201/0209* (2013.01); *Y10S 901/47* (2013.01)

(56) References Cited

U.S. PATENT DOCUMENTS

| | | | |
|---|---|---|---|
| 5,416,712 A | 5/1995 | Geier et al. | |
| 5,448,479 A | 9/1995 | Kemner et al. | |
| 6,108,031 A * | 8/2000 | King | G05D 1/0038 348/118 |
| 6,120,025 A | 9/2000 | Hughes | |
| 6,122,572 A | 9/2000 | Yavnai | |
| 6,463,368 B1 | 10/2002 | Feiten et al. | |
| 6,480,762 B1 | 11/2002 | Uchikubo et al. | |
| 6,535,793 B2 * | 3/2003 | Allard | B25J 9/1689 318/628 |
| 6,580,979 B2 | 6/2003 | Payton et al. | |
| 6,675,068 B1 | 1/2004 | Kawasaki | |
| 6,748,297 B2 | 6/2004 | Song et al. | |
| 6,778,097 B1 | 8/2004 | Kajita et al. | |
| 6,845,297 B2 * | 1/2005 | Allard | B25J 9/1689 318/628 |
| 6,957,712 B2 | 10/2005 | Song et al. | |
| 6,980,940 B1 | 12/2005 | Gurpinar et al. | |
| 7,194,397 B1 | 3/2007 | Bush | |
| 7,515,991 B2 | 4/2009 | Egawa et al. | |
| 7,653,800 B2 | 1/2010 | Zohar et al. | |
| 7,756,614 B2 | 7/2010 | Jouppi | |
| 7,813,835 B2 | 10/2010 | Fujita et al. | |
| 7,843,431 B2 * | 11/2010 | Robbins | G05D 1/0016 345/161 |
| 8,009,871 B2 | 8/2011 | Rafii et al. | |
| 8,280,635 B2 | 10/2012 | Ella et al. | |
| 8,396,611 B2 | 3/2013 | Phillips et al. | |
| 8,401,275 B2 | 3/2013 | Wang et al. | |
| 8,532,823 B2 | 9/2013 | McElroy et al. | |
| 8,577,517 B2 | 11/2013 | Phillips et al. | |
| 8,594,844 B1 | 11/2013 | Gal | |
| 8,760,397 B2 | 6/2014 | Robbins et al. | |
| 9,283,674 B2 | 3/2016 | Hoffman et al. | |
| 2001/0003713 A1 | 6/2001 | Willner et al. | |
| 2001/0037163 A1 | 11/2001 | Allard | |
| 2001/0048762 A1 | 12/2001 | Matsuura et al. | |
| 2002/0148871 A1 | 10/2002 | Nakano et al. | |
| 2002/0153185 A1 | 10/2002 | Song et al. | |
| 2002/0160654 A1 | 10/2002 | Kwoka | |
| 2003/0169906 A1 | 9/2003 | Gokturk et al. | |
| 2003/0216834 A1 | 11/2003 | Allard | |
| 2004/0078946 A1 | 4/2004 | Nakamoto et al. | |
| 2004/0088081 A1 | 5/2004 | Song et al. | |
| 2004/0111184 A1 | 6/2004 | Chiappetta et al. | |
| 2004/0216931 A1 | 11/2004 | Won | |
| 2004/0224765 A1 | 11/2004 | Martinez et al. | |
| 2004/0227819 A1 | 11/2004 | Houlberg | |
| 2005/0067994 A1 | 3/2005 | Jones et al. | |
| 2005/0192721 A1 | 9/2005 | Jouppi | |
| 2005/0216182 A1 | 9/2005 | Hussain et al. | |
| 2005/0246458 A1 | 11/2005 | Kavanagh | |
| 2006/0041333 A1 | 2/2006 | Anezaki | |
| 2006/0125806 A1 * | 6/2006 | Voyles | G06F 3/011 345/184 |
| 2006/0176660 A1 | 8/2006 | Amiri | |
| 2006/0178820 A1 | 8/2006 | Eglington et al. | |
| 2006/0226298 A1 | 10/2006 | Pierson | |
| 2007/0070072 A1 | 3/2007 | Templeman | |
| 2007/0078901 A1 | 4/2007 | Satou et al. | |
| 2007/0149214 A1 | 6/2007 | Walsh et al. | |
| 2007/0198144 A1 | 8/2007 | Norris et al. | |
| 2007/0294032 A1 | 12/2007 | Zumsteg et al. | |
| 2008/0009970 A1 | 1/2008 | Bruemmer | |
| 2008/0027590 A1 * | 1/2008 | Phillips | G05D 1/0088 701/2 |
| 2008/0027591 A1 | 1/2008 | Lenser et al. | |
| 2008/0086241 A1 * | 4/2008 | Phillips | G05D 1/0038 701/2 |
| 2008/0096654 A1 | 4/2008 | Mondesir et al. | |
| 2008/0172531 A1 | 7/2008 | Liu et al. | |
| 2008/0266254 A1 | 10/2008 | Robbins et al. | |
| 2009/0037033 A1 * | 2/2009 | Phillips | G05D 1/0088 701/2 |
| 2009/0089028 A1 | 4/2009 | Sagert et al. | |
| 2009/0177844 A1 | 7/2009 | Naylor et al. | |
| 2009/0301522 A1 | 12/2009 | Abehasera et al. | |
| 2010/0011523 A1 | 1/2010 | Larkowski et al. | |
| 2010/0082193 A1 | 4/2010 | Chiappetta | |
| 2011/0088895 A1 | 4/2011 | Pop et al. | |
| 2011/0106339 A1 * | 5/2011 | Phillips | G05D 1/0033 701/2 |
| 2011/0109549 A1 | 5/2011 | Robbins et al. | |
| 2011/0161133 A1 | 6/2011 | Staveley et al. | |
| 2011/0264303 A1 | 10/2011 | Lenser et al. | |
| 2012/0016589 A1 | 1/2012 | Li et al. | |
| 2012/0101661 A1 | 4/2012 | Phillips et al. | |
| 2012/0166024 A1 | 6/2012 | Phillips et al. | |
| 2012/0185091 A1 * | 7/2012 | Field | G05D 1/0044 700/254 |
| 2012/0268587 A1 | 10/2012 | Robbins et al. | |
| 2013/0013108 A1 | 1/2013 | Jacobsen et al. | |
| 2013/0166107 A1 | 6/2013 | Robbins et al. | |
| 2013/0206477 A1 | 8/2013 | Boone | |
| 2013/0268118 A1 * | 10/2013 | Grinstead | B25J 19/023 700/259 |
| 2014/0247119 A1 | 9/2014 | Robbins et al. | |
| 2014/0247261 A1 | 9/2014 | Lenser et al. | |

OTHER PUBLICATIONS

Notice of allowance and fee(s) due for U.S. Appl. No. 14/507,653 (Nov. 16, 2015).

Office action for U.S. Appl. No. 14/507,653 (Oct. 23, 2015).

"Tactical Robotic Controller," Qinetiq North America, Reston, VA (https://www.qinetiq-na.com/products/unmanned-systems/trc) , p. 1-1 (2015).

Green et al., "Telepresence Surgery," IEEE, p. 324-329 (1995).

Mair, "The Technology and its Economic and Social Implications," IEEE, p. 118-124 (1997).

Shimoga et al.. "Touch and Force Reflection for Telepresence Surgery," IEEE, p. 1049-1050 (1994).

* cited by examiner

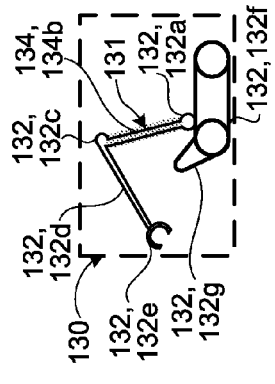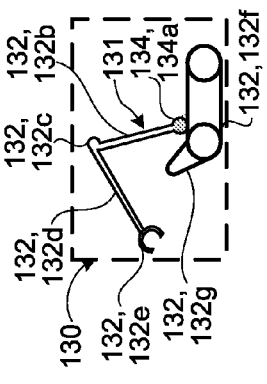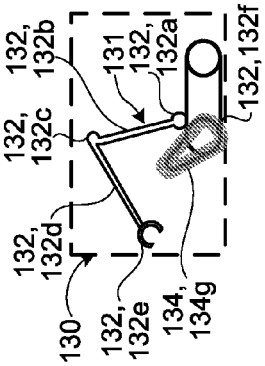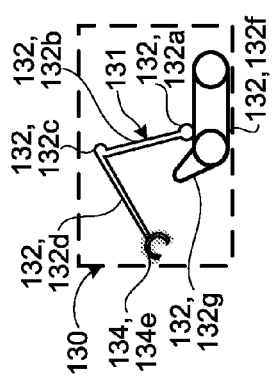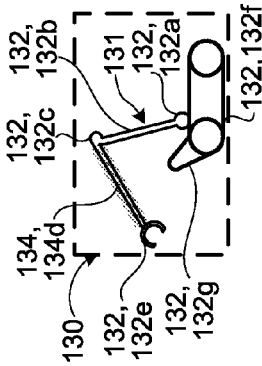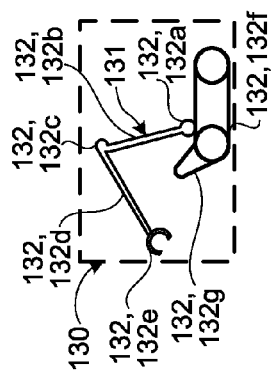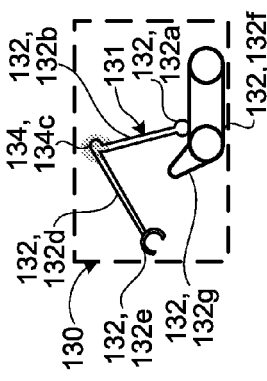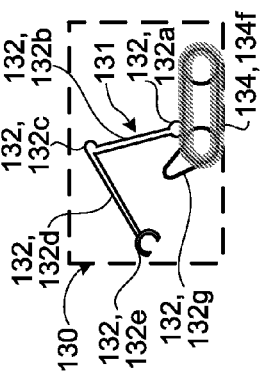

REMOTELY OPERATING A MOBILE ROBOT

CROSS REFERENCE TO RELATED APPLICATIONS

This U.S. patent application is a divisional of U.S. patent application Ser. No. 14/507,653, filed Oct. 6, 2014, which claims priority under 35 U.S.C. §119(e) to U.S. Provisional Application 61/924,433, filed on Jan. 7, 2014, which are hereby incorporated by reference in their entireties.

TECHNICAL FIELD

This disclosure relates to a method and a system for remotely controlling a robot and augmenting images captured by the robot.

BACKGROUND

Robots are useful in a variety of civilian, commercial, military, and law enforcement applications. For instance, some robots may inspect or search buildings with structural damage caused by earthquakes, floods, or hurricanes, or inspect buildings or outdoor sites contaminated with radiation, biological agents, such as viruses or bacteria, or chemical spills. Some robots carry appropriate sensor systems for inspection or search tasks.

There is an increasing need for an intuitive system for remotely controlling robots. In some situations, the robot operates within hazardous or dangerous conditions, e.g., the transport of hazardous materials, search and rescue operations, and military and law enforcement applications. In such situations, the user may not be within the vicinity of the robot and may not be able to see the robot. The user relies on sensors (e.g., cameras) that are located on or surrounding the robot to control the robot. Therefore, an intuitive teleoperation of the robot becomes particularly important.

SUMMARY

One aspect of the disclosure provides a method for operating a robot. The method includes electronically receiving images and augmenting the images by overlaying a representation of the robot on the images. The representation includes user-selectable portions corresponding to movable portions of the robot. The method further includes electronically displaying the augmented images and receiving an indication of a selection of at least one user-selectable portion of the robot representation. The method further includes electronically displaying an intent to command the selected at least one user-selectable portion of the representation and receiving an input representation of a user interaction with at least one user-selectable portion. The method also includes determining at least one movement parameter of at least one movable portion of the robot using inverse kinematics based on the received input and issuing a command to the robot based on the at least one movement parameter.

Implementations of the disclosure may include one or more of the following features. In some implementations, the received images are captured by an imaging device (e.g., camera) disposed on the robot or by an imaging device in the vicinity of the robot.

In some implementations, a representation of the robot includes at least one of a representation of a vehicle body, a gripper, a link, or an actuator. Additionally or alternatively, the method may include electronically displaying the intent to command the selected at least one-user selectable robot representation including modifying an appearance of the robot representation.

The method may include receiving the input representative of the user interaction from a touch display. The input includes at least one of a linear finger swipe, a curved finger swipe, a multi-finger swipe, a multi-finger gesture, a tap, or a prolonged press.

In some implementations, the method includes receiving the input representative of the user interaction with at least one user-selectable portion. The method further includes receiving a first input representative of a selection of a displayed object and receiving a second input representative of a selection of a robot behavior. The robot behavior is associated with the object. Additionally or alternatively, the robot behavior includes navigating the robot towards the object. The method may include receiving an indication of a selection of an alternate approach direction. In response to the indication, the robot behavior determines a drive path using odometry and/or inertial measurement signals from an inertial measurement unit of the robot to navigate the robot from a current location and a current approach direction to approach the object from the alternate approach direction. In some examples, the robot behavior includes grasping the object with a manipulator of the robot. The method may further include identifying in the images a plane of a ground surface supporting the robot and a location of the object with respect to the ground surface plane.

In some examples, the method further includes receiving an indication of a selection of a reverse-out behavior and executing the reverse-out behavior. The reverse-out behavior determines at least one reverse-movement parameter of the at least one movable portion of the robot using inverse kinematics to move the at least one movable portion of the robot in an opposite direction along a path moved according to the issued command, and commands the at least one movable portion of the robot based on the at least one reverse-movement movement parameter.

The method may further include receiving an indication of a selection of an anti-tip behavior and executing the anti-tip behavior. The anti-tip behavior receives inertial measurement signals from an inertial measurement unit of the robot and determines a location of a center of gravity of the robot. When the location of the center of gravity of the robot moves outside a stable volume of space, the anti-tip behavior commands deployment of an appendage of the robot (e.g., a flipper or an articulated arm) to alter the location of the center of gravity of the robot or brace the robot against a supporting surface to prevent tipping of the robot.

In some implementations, the method includes providing haptic feedback in response to the received input. The method may also include issuing a negative feedback response when the determined at least one movement parameter of the at least one movable portion of the robot based on the received input violates a movement policy or is unexecutable. The negative feedback response includes at least one of the haptic feedback response, an audio feedback response, or a visual feedback response. The visual feedback response includes displaying an indicator at or near any portions of the robot representation corresponding to any unmovable portions of the robot based on the received input.

Another aspect of the disclosure provides an operator controller unit for controlling a robot. The operator controller unit includes a screen and a processor in communication with the screen. The processor is configured to electronically receive images and augment the images by overlaying a representation of the robot on the images. The robot representation includes user-selectable portions corresponding to movable portions of the robot. The processer is further configured to electronically display the augmented images on the screen and receive an indication from the screen of a selection of at least one user-selectable portion of the robot representation. The processor is also configured to electronically display on the screen an intent to command the selected at least one user-selectable portion of the robot representation and receive an input from the screen representative of a user interaction with at least one user-selectable portion. The processer further determines at least one movement parameter of at least one movable portion of the robot using inverse kinematics based on the received input and issues a command to the robot based on the at least one movement parameter. In some implementations, the received images are captured by an imaging device disposed on the robot or by an imaging device located in a vicinity of the robot.

In some examples, the representation of the robot includes at least one of a representation of a vehicle body, a gripper, a link, or an actuator. Additionally or alternatively, the unit includes electronically displaying the intent to command the selected at least one user-selectable robot representation portion including modifying an appearance of the representation of the robot (e.g., by highlighting the robot representation).

The operator controller unit receives the input representative of the user interaction from a touch display and including at least one of a linear finger swipe, a curved finger swipe, a multi-finger swipe, a multi-finger gesture, a tap, or a prolonged press. In some implementations, the unit receives an input representative of a user interaction with at least one user-selectable portion. The unit further receives a first input representative of a selection of a displayed object and receiving a second input representative of a selection of a robot behavior. The robot behavior is associated with the object. Additionally or alternatively, the robot behavior includes navigating the robot towards the object. Receiving the input representative of the user interaction further includes receiving an indication of a selection of an alternate approach direction. In response to the indication, the robot behavior determines a drive path using odometry and/or inertial measurement signals from an inertial measurement unit of the robot to navigate the robot from a current location and a current approach direction to approach the object from the alternate approach direction. In some examples, the robot behavior includes grasping the object with a manipulator of the robot. Additionally or alternatively, the processor executes a surface recognition routine that identifies in the images a plane of a ground surface supporting the robot and a location of the object with respect to the ground surface plane.

In some implementations, the processor is configured to receive an indication of a selection of a reverse-out behavior and execute the reverse-out behavior. The reverse-out behavior determines at least one reverse-movement parameter of the at least one movable portion of the robot using inverse kinematics to move the at least one movable portion of the robot in an opposite direction along a path moved according to the issued command, and commands the at least one movable portion of the robot based on the at least one reverse-movement parameter.

The processor may be configured to receive an indication of a selection of an anti-tip behavior and execute the anti-tip behavior. The anti-tip behavior receives inertial measurement signals from an inertial measurement unit of the robot and determines a location of a center of gravity of the robot. The anti-robot behavior commands deployment of an appendage of the robot to alter the location of the center of gravity of the robot or brace the robot against a supporting surface to prevent tipping of the robot, when the location of the center of gravity of the robot moves outside a stable volume of space.

In some implementations, the operator controller unit includes a vibration device. The processor is configured to command the vibration device to provide haptic feedback in response to the received input. Additionally or alternatively, when the determined at least one movement parameter of the at least one movable portion of the robot based on the received input violates a movement policy or is unexecutable, the processor may be configured to issue a negative feedback response. The negative feedback response includes at least one of the haptic feedback response, an audio feedback response, or a visual feedback response. The visual feedback response includes displaying on the screen an indicator at or near any portions of the robot representation corresponding to any unmovable portions of the robot based on the received input.

Another aspect of the disclosure provides a method for operating multiple robots. The method includes identifying multiple robots in communication with a network and for each identified robot, electronically displaying a robot identity, a wireless communication signal strength, and a communication position within any series of robots relaying communications to the network. The method further includes establishing control of one or more of the robots, and for each controlled robot, electronically receiving images from the controlled robot, augmenting the images by overlaying a representation of the corresponding robot on the images, and electronically displaying the augmented images. The robot representation includes user-selectable portions corresponding to movable portions of the corresponding robot.

In some implementations, for at least one controlled robot, the method includes receiving an indication of a selection of at least one user-selectable portion of the corresponding robot representation of the at least one controlled robot, electronically displaying an intent to command the selected at least one user-selectable portion of the corresponding robot representation, and receiving an input representative of a user interaction with at least one user-selectable portion. For at least the one controlled robot, the method also includes determining at least one movement parameter of at least one movable portion of the corresponding robot using inverse kinematics based on the received input and issuing a command to the corresponding robot based on the at least one movement parameter. The representation of the at least one controlled robot includes at least one of a representation of a vehicle body, a representation of a gripper, a representation of a link, or a representation of an actuator. Electronically displaying the intent to command the selected at least one user-selectable robot representation portion includes modifying an appearance of the robot representation. In some examples, the input representative of the user interaction is received from a touch display and includes at least one of a linear finger swipe, a curved finger swipe, a multi-finger swipe, a multi-finger gesture, a tap, or a prolonged press.

In some implementations, receiving the input representative of the user interaction with at least one user-selectable portion includes receiving a first input representative of a selection of a displayed object and receiving a second input representative of a selection of a robot behavior. The robot behavior is associated with the object. The robot behavior includes navigating the at least one controlled robot towards the object. The method also includes receiving an indication of a selection of an alternate approach direction. The robot behavior determines a drive path using odometry and/or inertial measurement signals from an inertial measurement unit of the robot to navigate the at least one controlled robot from a current location and a current approach direction to approach the object from the alternate approach direction. The robot behavior my include grasping the object with a manipulator of the robot. In some examples, the method includes identifying in the images a plane of a ground surface supporting the at least one controlled robot and a location of the object with respect to the ground surface plane.

In some implementations, the method further includes receiving an indication of a selection of a reverse-out behavior and executing the reverse-out behavior. The reverse-out behavior determines at least one reverse-movement parameter of the at least one movable portion of the robot using inverse kinematics to move the at least one movable portion of the at least one controlled robot in an opposite direction along a path moved according to the issued command, and commands the at least one movable portion of the at least one controlled robot based on the at least one reverse-movement parameter.

The method may include providing haptic feedback in response to the received input. In some examples, the method includes issuing a negative feedback response when the determined at least one movement parameter of the at least one movable portion of the robot based on the received input violates a movement policy or is unexecutable. The negative feedback response includes at least one of the haptic feedback response, an audio feedback response, or a visual feedback response. The visual feedback response includes displaying an indicator at or near any portions of the robot representation corresponding to any unmovable portions of the robot based on the received input.

In some implementations, the method further includes receiving an indication of a selection of a series of robots in communication with the network and an order of deployment of a communication repeater deployment carried by each of the selected robots, and issuing repeater deployment instructions to each of the selected robots. Each repeater instruction indicates a repeater deployment order of the corresponding robot with respect to the other selected robots. Moreover, each selected robot deploys its carried communication repeater when the robot maneuvers to or near an edge of a wireless communications reception area of the network. Each repeater instruction includes a repeater deployment location. The method may further include communicating with and using a remote scalable computing resource to execute commands demanding a threshold computing capacity.

Yet another aspect of the disclosure provides a system for controlling multiple robots. The system includes a network, multiple robots that are wirelessly communicating with the network, and multiple operator control units in communication with the network. Each operator controller unit includes a screen and a processor in communication with the screen. The processor is configured to identify the multiple robots in communication with the network and establish control of one or more of the robots. For each identified robot, the processor is configured to electronically display a robot identity, a wireless communication signal strength, and a communication position within any series of robots relaying communications to the network. In addition, for each controlled robot, the processor is configured to electronically receive images from the one or more controlled robots, augment the images by overlaying a representation of the corresponding robot on the images, and electronically display the augmented images. The robot representation includes user-selectable portions corresponding to movable portions of the corresponding robot.

In some implementations, for at least one controlled robot, the processor is configured to receive an indication of a selection of at least one user-selectable portion of the corresponding robot representation of the at least one controlled robot and electronically display an intent to command the selected at least one user-selectable portion of the corresponding robot representation. For the at least one controlled robot, the processor is also configured to receive an input representative of a user interaction with at least one user-selectable portion, determine at least one movement parameter of at least one movable portion of the corresponding robot using inverse kinematics based on the received input, and issue a command to the corresponding robot based on the at least one movement parameter. The representation of the at least one controlled robot includes at least one of a representation of a vehicle body, a representation of a gripper, a representation of a link, or a representation of an actuator. Electronically displaying the intent to command the selected at least one user-selectable robot representation portion includes modifying an appearance of the robot representation. In some examples, the input representative of the user interaction is received from a touch display and includes at least one of a linear finger swipe, a curved finger swipe, a multi-finger swipe, a multi-finger gesture, a tap, or a prolonged press.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 4B-4I are schematic views of an exemplary robot representation showing different robot portions selected.

Like reference symbols in the various drawings indicate like elements.

DETAILED DESCRIPTION

Autonomous and semi-autonomous robots can be used to monitor, observe, survey, and/or service people or equipment. The robot may operate continuously for a duration of time without human intervention or be teleoperated by a remote user.

Figure 1:
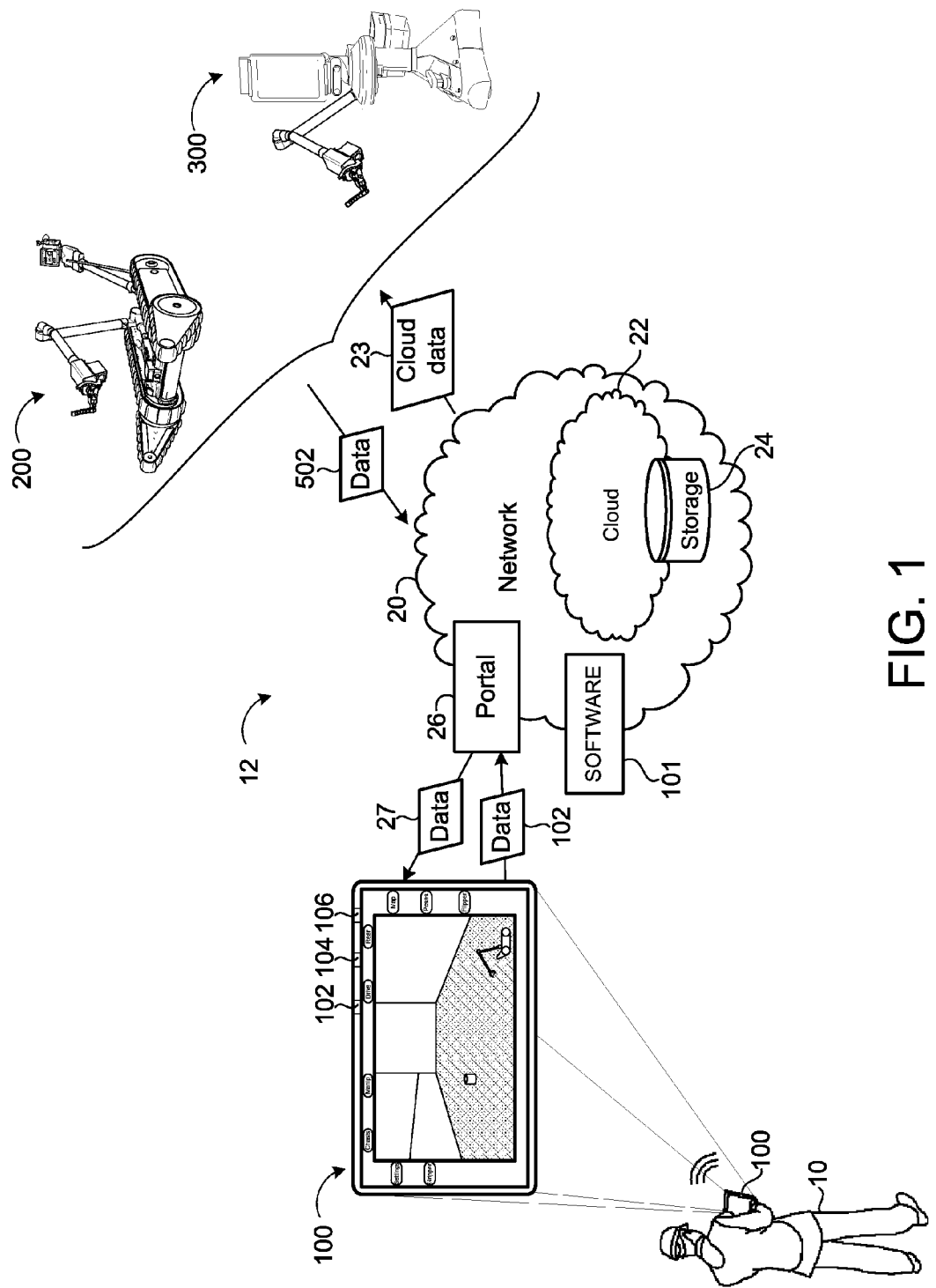
FIG. 1 is a schematic view of an exemplary robot communicating with a remote computing device.

Referring to FIG. 1, a user 10 may use a remote operator control unit (OCU) 100 to teleoperate a remote robot 200 from a distance. The OCU may include a computing device 102 (e.g., a computer processor) and non-transitory memory 104 in communication with the computing device 102. The non-transitory memory 104 may store instructions for execution on the computing device 102.

The robot 200 may not be within the field of view of the user 10. In such cases, the OCU 100 is capable of communicating over a network 20. The network 20 may include any type of network that allows sending and receiving of communication signals (e.g., a wireless telecommunication network, a cellular telephone network, a time division multiple access (TDMA) network, a code division multiple access (CDMA) network, a global system for mobile communications (GSM), a third generation (3G) network, a fourth generation (4G) network, a satellite communications network, and other communication networks). The network 20 may include one or more of a Wide Area Network (WAN), a Local Area Network (LAN), and a Personal Area Network (PAN). In some examples, the network 20 includes a combination of data networks and telecommunication networks. In addition, the network 20 may switch between any of the above networks depending on the strength of the signal of the specific type of network.

Cloud storage 24 can be a model of networked computer data storage where data is stored on multiple virtual servers, generally hosted by third parties. By providing communication between the robot 200 and a cloud 22, information gathered by the robot 200 can be securely viewed by authorized users 10 via a web based information portal 26. The portal 26 may be used for gathering and/or providing information, such as user information, facility status information, and robot status information. Information can be integrated with third-party information to provide additional functionality and resources to the user 10 and/or the robot 200. The robot system architecture 12 can facilitate proactive data collection. For example, data 502 collected using the sensor system 500 of the robot 200 (see e.g., FIGS. 2B and 7) can be communicated to the cloud 22 (e.g., wireless communication, such as Wi-Fi, radio frequency (RF), etc.) for collection, storage, and/or analysis. Moreover, the remote user 10 may access the received sensor data 502 for review, analysis, and control of the robot 200. In some examples, the cloud service 22 executes an application outputting data 23 that may be communicated to the robot 200. For example, the cloud service 22 may process received image data 502 (captured by the robot 200) and return a processed data set 23 (e.g., a layout map of the environment) to the robot 200 (e.g., to a controller 400). The controller 400 may issue drive commands to the drive system 215 based on the received processed data set 23 for maneuvering about an area. In some examples, the cloud 22 receives data 102 from the user 10 using the remote OCU 100. The cloud 22 may process the received information from the robot 200 and send the processed information 27 to the OCU 100.

The cloud 22 provides cloud computing and/or cloud storage capabilities. Cloud computing may provide Internet-based computing, whereby shared servers provide resources, software, and data to computers and other devices on demand. For example, the cloud 22 may be a cloud computing service that includes at least one server computing device, which may include a service abstraction layer and a hypertext transfer protocol wrapper over a server virtual machine instantiated thereon. The server computing device may be configured to parse HTTP requests and send HTTP responses. Cloud computing may be a technology that uses the Internet and central remote servers to maintain data and applications. Alternatively, the Cloud may be a local server or computational device that emulates a subset of the available data and capability of the Cloud, with an experience that is seamless to the end user based on local or cloud connectivity. Cloud computing can allow users to access and use applications without installation and access personal files at any computer with internet access. Cloud computing allows for relatively more efficient computing by centralizing storage, memory, processing and bandwidth. The cloud 22 can provide scalable, on-demand computing power, storage, and bandwidth, while reducing robot hardware requirements (e.g., by freeing up CPU and memory usage). Robot connectivity to the cloud 22 allows automatic data gathering of robot operation and usage histories without requiring the robot 200 to return to a base station. Moreover, continuous data collection over time can yield a wealth of data that can be mined for marketing, product development, and support.

Figure 2A:
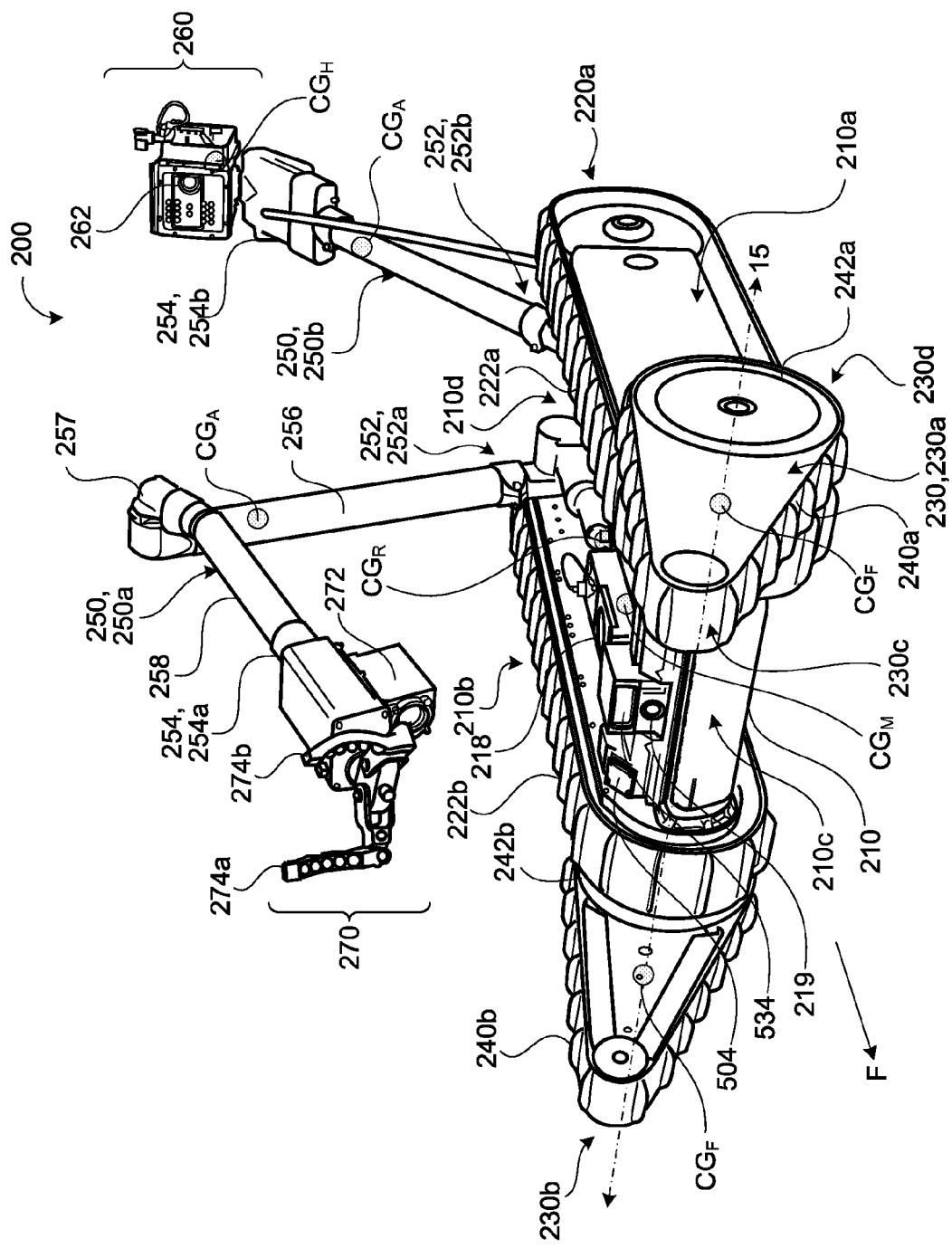
FIG. 2A is a front perspective view of an exemplary robot.
Figure 2B:
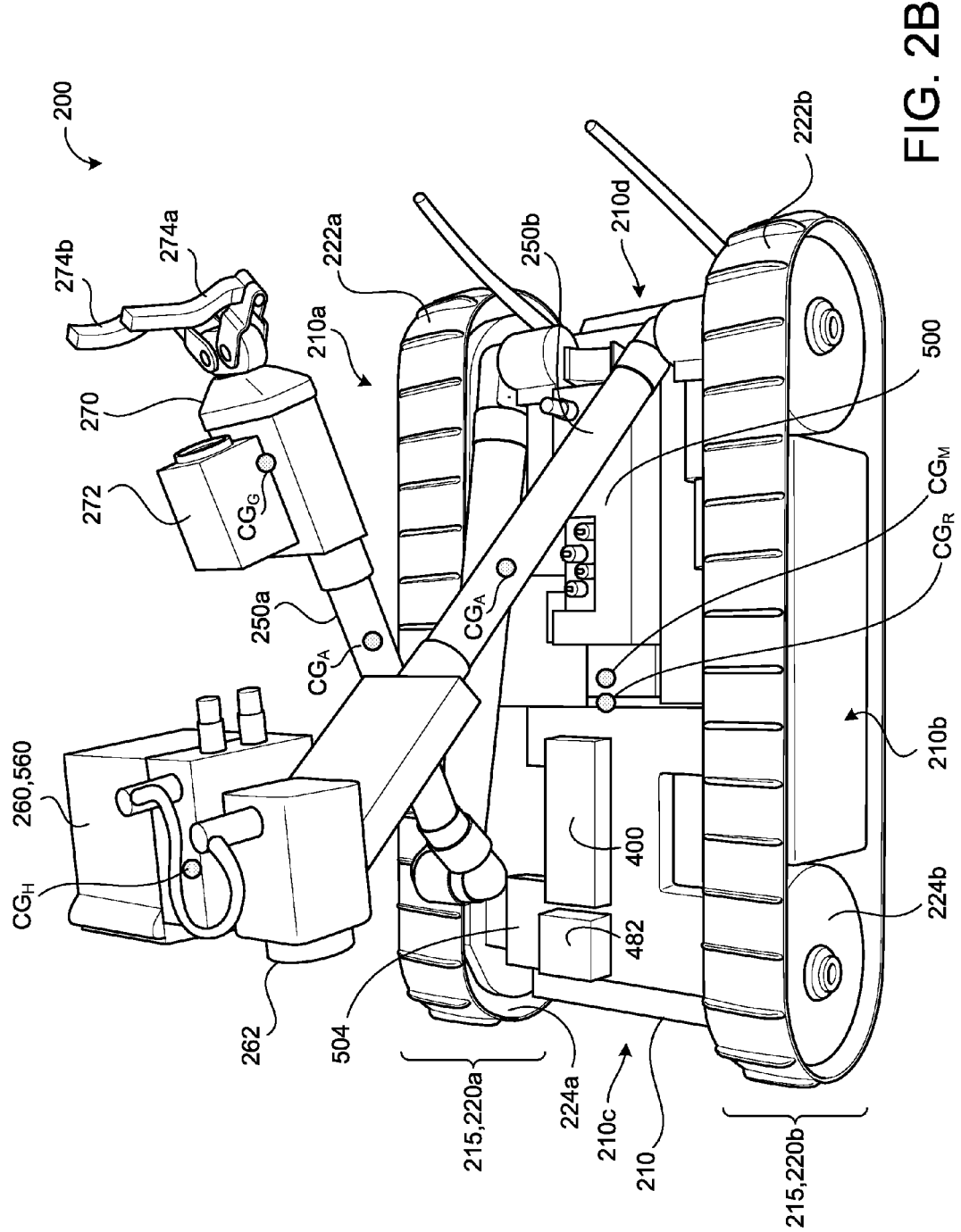
FIG. 2B is a side perspective view of an exemplary robot.

FIGS. 2A-2B illustrate two exemplary mobile robotic vehicles or robots 200 that may be controlled by the OCU 100. The robot 200 shown includes a track driven drive system 215 having flippers 230. Other mobility platforms, configurations and morphologies are possible as well, such as crawling or walking platforms, etc. The robots 200 can be designed to move about in a variety of environments, including an urban environment of buildings (including staircases), streets, underground tunnels, building ruble, and in vegetation, such as through grass and around trees. The robots 200 may have a variety of features, which provide robust operation in these environments, including impact resistance, tolerance of debris entrainment, and invertible operability.

In some examples, the robot 200 includes a main body 210 (or chassis) having a drive system 215 supported by the main body 210. The main body 210 has right and left sides 210a, 210b as well as a leading end 210c, a trailing end 210d and a center of gravity $CG_M$. The robot 200 may be electrically powered (e.g., by a bank of standard military BB-2590 replaceable and rechargeable lithium-ion batteries).

In some implementations, the drive system 215 includes right and left driven track assemblies 220a, 220b (also referred to as the main tracks 220) mounted on the corresponding right and left sides 210a, 210b of the main body 210 and having right and left driven tracks 222a, 222b, respectively. Each driven track 222a, 222b is trained about a corresponding front wheel, 224a, 224b, which rotates about a drive axis 15. The tracks 222a, 222b provide a relatively large traction area (e.g., covering a foot print of the main body 210 and the tracks 222a, 222b), allowing the robot 200 to traverse varied terrain, such as cables, stairs, uneven surfaces, etc. Although the robot 200 is depicted as having skid steer driven tracks, other drive systems are possible as well, such as differentially driven wheels, articulated legs, etc.

Referring to FIG. 2A, in some implementations, the robot 200 includes at least one extendable flipper 230 mounted on the main body 210. In the example shown, the robot 200 includes right and left flippers 230a, 230b, each having a flipper track 240, 240a, 240b trained about a flipper drive wheel 242a, 242b, which is driven about a drive axis 15 defined at a pivot end 130d of the flipper 230a, 230b.

In the example shown in FIG. 2B, the robot 200 is depicted without any flippers 230. The robot 200 may be configured to releasably receive one or more flippers 230 onto the main body 210 (e.g., onto and concentric with one of the front drive wheels 224a, 224b at the leading end 210c of the main body 210). The main body 210 may include one or more cameras 218, 219 disposed near the leading end 210c of the main body 210 and may be positioned to have a field of view directed forward and/or upward. The camera(s) 218, 219 may capture images and/or video of the robot environment for navigating the robot 200 and/or performing specialized tasks.

Figure 3A:
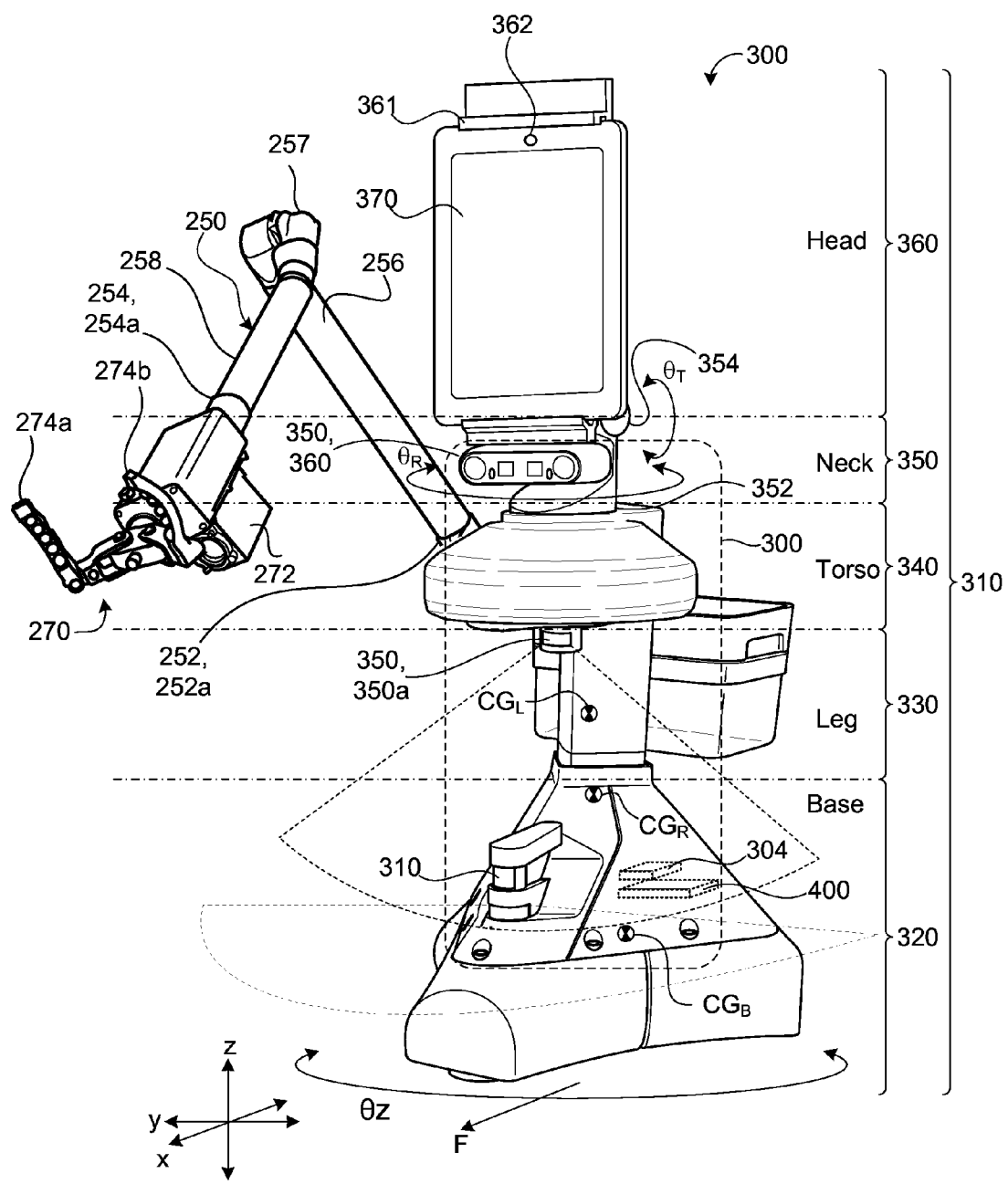
FIG. 3A is a perspective view of an exemplary mobile inspection robot.
Figure 3B:
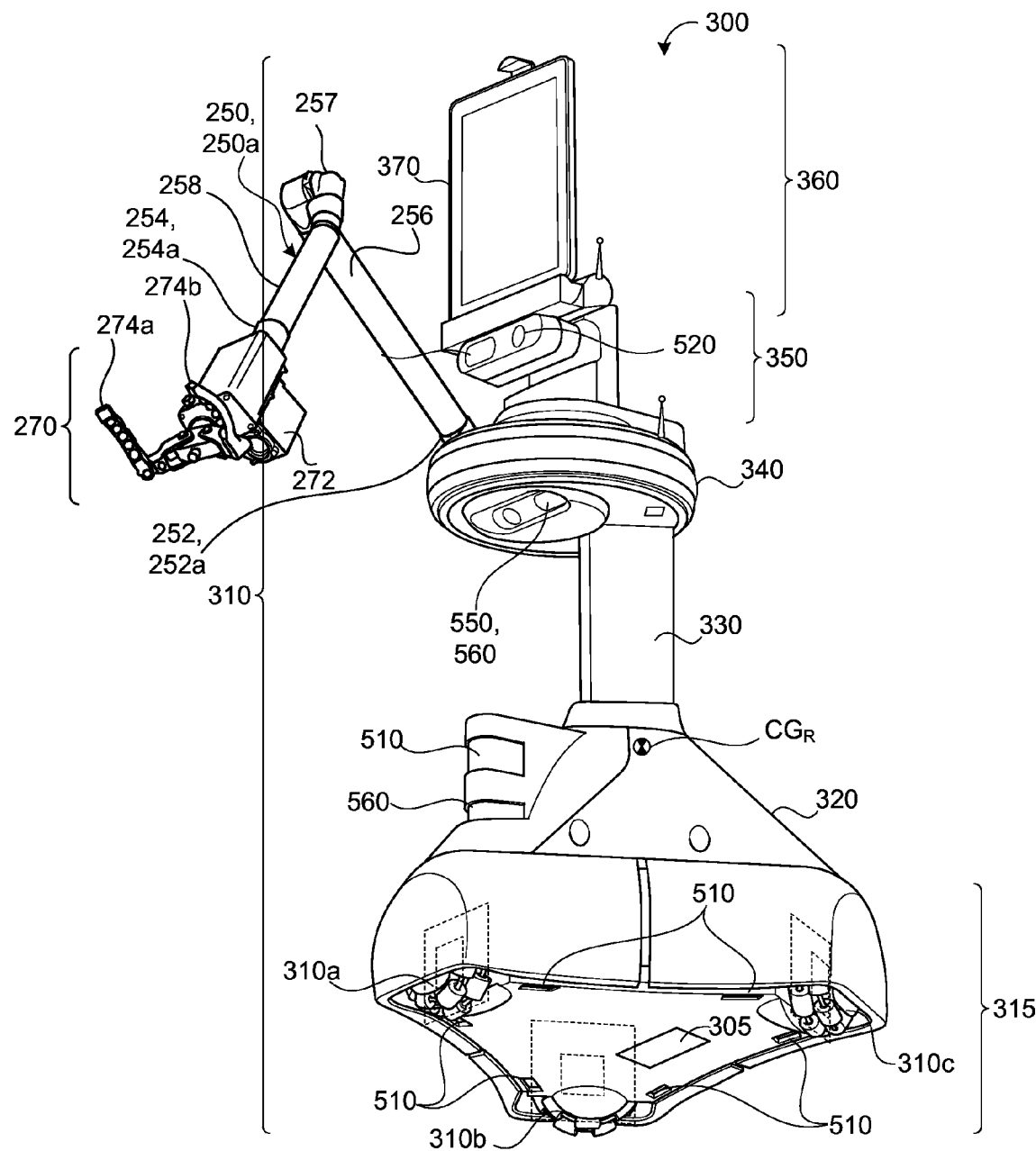
FIG. 3B is an elevated perspective view of an exemplary mobile inspection robot.

Referring to FIGS. 3A and 3B, in some implementations, a mobile robot 300 includes a robot body 310 (or chassis) that defines a forward drive direction F. The robot 300 also includes a drive system 315 and a sensor system 500, each supported by the robot body 310 and in communication with a controller 400 that coordinates operation and movement of the robot 300. A power source 305 (e.g., battery or batteries) can be carried by the robot body 310 and is in electrical communication with, and delivers power to, each of these components, as necessary.

In some implementations, the drive system 315 may provide omni-directional and/or holonomic motion control of the robot 300. As used herein the term "omni-directional" refers to the ability to move in substantially any planar direction, i.e., side-to-side (lateral), forward/back, and rotational. These directions are generally referred to herein as x, y, and Δz, respectively. Furthermore, the term "holonomic" is used in a manner substantially consistent with the literature use of the term and refers to the ability to move in a planar direction with three planar degrees of freedom, i.e., two translations and one rotation. Hence, a holonomic robot has the ability to move in a planar direction at a velocity made up of substantially any proportion of the three planar velocities (forward/back, lateral, and rotational), as well as the ability to change these proportions in a substantially continuous manner.

In some implementations, the drive system 315 includes first, second, and third driven drive wheels 310a, 310b, 310c equally spaced (e.g., trilaterally) about a vertical axis Z; however, other arrangements are possible as well, such as four drive wheels equally spaced about the Z axis. The drive wheels 310a-c may define a transverse arcuate rolling surface (i.e., a curved profile in a direction transverse or perpendicular to the rolling direction $D_R$), which may aid maneuverability of the holonomic drive system 315. Other drive wheel arrangements are possible as well, such as a single drive wheel (e.g., holonomically driven), only right and left drive wheels, or four drive wheels.

The robot body 310 may include a base 320 supporting the drive system 315, at least one leg 330 extending upwardly from the base 320, and a torso 340 supported by the at least one leg 330. The leg 330 may be extendible to alter a height of the torso 340, which may support one or more sensors of the sensor system 500. The base 320 may include enough weight (e.g., by supporting the power source 305 (batteries) to maintain a low center of gravity $CG_B$ of the base 320 and a low overall center of gravity $CG_R$ of the robot 300 for maintaining mechanical stability. The robot body 310 may also include a neck 350 supported by the torso 340. The neck 350 supports a head 360 by providing panning and tilting of the head 360 with respect to the torso 340. In the example shown, the neck 350 includes a rotator 352 and a tilter 354. The rotator 352 may provide a range of angular movement $\theta_R$ (e.g., about the Z axis) of between about 90° and about 360°. Other ranges are possible as well. In some examples, the robot 300 may adjust a height of the torso 340 (via the leg 330), articulate the head 360, and/or move using the drive system 315. As will later be discussed, a remote user 10 may manipulate the height of the torso 340 (via the leg 330), articulate the head 360, and/or move using the drive system 315 via the OCU 100.

The head 360 may include a tablet dock 361 for releasably receiving one or more computing tablets 370, also referred to as a web pad or a tablet PC, each of which may have a touch screen. The computing tablet 370 may execute instructions to display a graphical user interface for operating and/or interacting with the robot 300.

Referring back to FIGS. 2A-2B, the robot 200 may include one or more arms 250, 250a, 250b (e.g., articulated arms) each having a pivot end 252, pivotally coupled to the main body 210 and a distal end 254, 254a, 254b that may be configured to receive a head 260 (as shown on arm 250b) or a gripper 270. In some examples, the arm 250 includes a first portion 256 and a second portion 258 connected by a joint 257.

In some implementations, the robot 200 includes first and/or second arms 250a, 250b each having a pivot end 252a, 252b pivotally coupled to the main body 210. Both arms 250a, 250b may be attached at a common location or region of the main body 210, such as the leading end 210c or the trailing end 210d (as shown) of the main body 210, the arms 250a, 250b can be disposed at opposite ends of the main body 210 as well. As shown in FIG. 2A, a gripper 270 is mounted on the distal end 254a of the first arm 250a and a head 260 is mounted on the distal end 254b of the second arm 250b. In some examples, a first gripper is mounted on the distal end 254a of the first arm 250a and a second gripper 270 is mounted on the distal end 254b of the second arm 250b. In the example shown, the gripper 270 includes a gripper camera 272 and first and second opposing fingers or tongs 274a, 274b for grasping objects 114.

The arm 250, 250a, 250b has an arm center of gravity $CG_A$ and the head 260, 360 has a center of gravity $CG_H$. The head 260, 360 may include a camera 262, 362 (e.g., visible light and/or infrared camera), radar, LIDAR (Light Detection And Ranging, which can entail optical remote sensing that measures properties of scattered light to find range and/or other information of a distant target), LADAR (Laser Detection and Ranging), a communication device (radio frequency, wireless, etc.), and/or other components. The robot 200 may move the arm 250, 250a to position the head camera 262, 362 to provide a better view of the front of the robot 200 so the user 10 may better control the robot 200 due to better visibility of what is around the robot 200.

In some implementations, the robot 200 includes a controller 400 in communication with the drive system 215, 315 and any arm(s) 250, 250a, 250b and head(s) 260, 360 or gripper(s) 270 mounted on the arm(s) 250, 250a, 250b. The controller 400 may issue drive commands to one or more motors driving the main tracks 220 and the flipper tracks 240, 240a, 240b or the legs 330. Moreover, the controller 400 may issue rotational commands to a flipper motor to rotate the flippers 230 about the drive axis 15. The controller 400 may include one or more computer processors and associated memory systems. The controller 400 of the robot 200 may include a communication system 482, which includes, for example, a radio to communicate with a remote OCU 100 to receive commands and issue status and/or navigation information.

Referring back to FIG. 1, in some implementations, a teleoperation software application 101 executes on at least one of the robot controller 400, the cloud 22, or the OCU 100. In some examples, a portion of the teleoperation software application 101 executes on one or more of the aforementioned devices. The teleoperation software application 101 allows one or more users 10 to interact with the robot 200 (e.g., to drive the robot 200) and/or remotely with other people or objects 114 adjacent the robot 200, 300 through telepresence features of the robot 200.

Referring to FIGS. 4A-4M, the OCU 100 may include a display (e.g., LCD or touch screen) 110, a keyboard, and one or more auxiliary user inputs, such as a joystick or gaming unit in communication with the computing device 102. As shown, the OCU 100 is a touch screen tablet. The OCU 100 provides a user interface of the teleoperation software application 101 that is rendered on the display 110 of the OCU 100 and allows an operator or user 10 to control the robot 200 from a distance. In some examples, the user 10 can select different levels of human control over the robot 200, ranging from a teleoperation mode, in which the user 10 directly controls the motors and actuators on the robot 200, to autonomous operation, in which the user 10 passes higher-level commands to the robot 200. In partially autonomous operation, the robot 200 can perform tasks, such as following a perimeter or wall, recovering from getting stuck in an opening or due to high centering on an obstruction, evading a moving object 114, or seeking light.

The OCU 100 includes a touchscreen display 110. The touchscreen display 110 is configured to receive gestures from a user 10 and/or a pen (e.g., stylus). The display 110 may be configured for multi-touch gestures, which allows a user 10 to use one or more fingers simultaneously on the display 110. The display 110 eliminates the need for a mouse, a touchpad, a gamepad, or any other intermediate devices. Therefore, the only equipment needed to control the robot 200 is a touchscreen OCU 100 instead of other equipment and accessories to manipulate the robot 200. In some implementations, the OCU 100 is configured to control more than one robot 200. For example, the user 10 may select which robot 200 the user 10 wants to manipulate: the one having the flippers or the one having a leg or legs. In some examples, each robot 200 has different configurations; therefore, the OCU 100 is updated based on the robot 200 the user 10 selects to manipulate (see FIGS. 7A-8C).

The display 110 of the OCU 100 is configured to show a remote view 120, such as a video feed of the robot's environment. The video feed 120 may be generated by one of the cameras 218, 219, 262, 362 of the robot 200. An augmented image 121 is overlain on the video feed 120 (FIG. 4N shows the augmented images 121 without the video feed). The augmented image 121 includes a robot representation 130 overlain on the video feed view 120. The robot representation 130 includes user-selectable portions 132 (e.g., a pivot end representation 132a, a first arm portion representation 132b, a joint representation 132c, a second arm portion representation 132d, a gripper representation 132e, a robot body representation 132f, and a flipper 132g). As shown, the robot representation 130 is located on the bottom right corner of the display 110, but other locations are possible as well. In some examples, the user 10 can move the robot representation 130 to another portion of the display 110. Additionally or alternatively, the user 10 may adjust the size of the robot representation 130 or may select to view the robot representation 130 as a three-dimensional view (as shown in FIGS. 4L and 4M). When a user 10 selects a portion of the robot representation 130, the software 101 changes the visual appearance of the user selectable portion 132 (e.g., color change or highlights) and displays a selected portion 134, thus displaying an intent to command the selected portion.

Referring to FIGS. 4B-4G, FIG. 4B shows the robot representation 130 without any user selectable portions 132 selected by the user 10. If the user 10 wants to move the gripper 270 of the robot 200, the user 10 may select the gripper representation 132e that is displayed on the display 110 of the OCU 100 by touching the gripper representation 132e with his/her finger. The gripper representation 132e is highlighted, as a gripper selected portion 134e, as shown in FIG. 4C, to indicate that the gripper 270 is ready for receiving a command. FIG. 4D shows the first arm portion representation 132b as a selected portion 134b; FIG. 4E shows the joint representation 132c as a selected portion 134c of the joint 257 that connects the first and second arm portions 256, 258; FIG. 4F shows the second arm representation 132d as a selected portion 134d; FIG. 4G shows a pivot end representation 132a selected as a selected portion 134a; FIG. 4H shows a body representation 132f as a selected portion 134f; and FIG. 4I shown a flipper representation 132g as a selected portion 134g. In addition, the user 10 may select other portions of the robot 200 to manipulate, such as the robot body 210 as a whole, or the flipper(s) 230, or any other portion. As shown, the representation 130 is representing a robot 200, having a flipper 230; however, the OCU 100 may be adjustable to represent other robots. The user 10 may select the gripper representation 132e and then touch an object 114 displayed on the display 110. The robot 200 traverses the floor to reach the object 114. In some examples, the robot 200 stops within a predetermined distance from the object 114. While in other examples, the robot 200 may grab the object 114.

Referring again to FIGS. 4A-4I, in some implementations, the OCU 100 includes a vibration device 106 in communication with the computing device 102 (also referred to as a processor). The processor 102 is configured to command the vibration device 106 to provide haptic feedback in response to a received input from a user 10. In some examples, the OCU 100 receives an input from a user 10 (e.g., via the screen 110) and when at least one movement parameter of at least one movable portion of the robot 200 based on the received input violates a movement policy or is unexecutable, the processor 102 of the OCU 100 may be configured to issue a negative feedback response. The negative feedback response includes at least one of a haptic feedback response (e.g., using the vibration device 106), an audio feedback response, or a visual feedback response. The visual feedback response includes displaying on the screen 110 an indicator at or near any portions of the robot representation 130 corresponding to any unmovable portions of the robot 200 based on the received input. Therefore, if the user 10 inputted on the OCU 100 that the user 10 wants the robot 200 to move its gripper 270 to a first position, and the gripper 270 is not capable of moving to the first position due to a constrain in the movement of the arm 250, then the processor 102 displays an indicator on the arm representation 131, alters an appearance of the arm representation 131, or otherwise informs the user 10 that the motion selected may not be completed due to a lack of motion clearance of the gripper 270. Thus, the robot 200 is configured to provide dynamic feedback of its motions while the user 10 remotely manipulates the robot 200 and parts thereof.

The controller 400 (and/or the OCU 100 or remote resources (e.g., cloud resources 22) in communication with the controller 400 and/or the OCU 100) may use kinematics equations to determine joint parameters of the arm 250 to provide a desired position of an end-effector 270 (e.g., griper). The controller 400 may use motion planning to specify movement of the robot 200, 300 so that its end-effector 270 achieves a desired task. Inverse kinematics transforms the motion plan into joint actuator trajectories for the robot 200, 300. The movement of a kinematic chain (i.e., the chain of rigid segments joined by joints), whether it is the actual robot 200, 300 or the robot representation 130 (e.g., an animated character), is modeled by the kinematics equations of the chain. These equations define the configuration of the chain in terms of its joint parameters. Forward kinematics uses the joint parameters to compute the configuration of the chain, and inverse kinematics reverses this calculation to determine the joint parameters that achieves a desired configuration.

In some implementations, the controller 400 calculates inverse kinematics of the robot movement to determine an end position of a robot joint from a first position that is different than the end position. Inverse kinematics uses kinematic equations of the robot 200 to determine joint parameters that provide a desired position of an end-effector. Inverse kinematics are more difficult to calculate than forward kinematics, which is the use of kinematic equations of a robot 200 to determine the position of the end-effector from specific values for the joint parameter. Inverse kinematics is mostly used for robotic assemblies having one or more rigid bodies (e.g., arms) connected by joints (serial manipulators). Therefore, when the user 10 manipulates the gripper representation 132e, the controller 400 uses the inverse kinematics algorithms to calculate the movement of the arm representation 131 and the robot arm 250. However, when the user 10 manipulates the pivot end representation 132a, forward kinematic algorithms are used to determine the location of the arm representation 131 and thus the arm 250 at the end position. When the user 10 manipulates the pivot end representation 132a, the representation of the whole arm 131 moves, because the pivot end representation 132a controls the movement of the arm 250. The controller 400 calculates the movement of the other arm portions 250a, 250b to avoid hitting any surrounding objects 114 or the robot 200 itself. The inverse kinematics formulas allow the controller 400 to calculate the joint parameters that position the robot arm 250 to pick up an object 114.

If the arm 250 has several degrees of freedom, the trajectory of moving an arm portion 250a, 250b or an end effector 270 along an array to an end point causes all of the other connected arm portions/joints to move accordingly to land the selected member at an end location. For example, the controller 400 may determine, using inverse kinematics formulas, movements of two arm portions 250a, 250b and/or an end-effector 270 joined by one or more joints to position the end-effector 270 in a location at the end of an array.

Figure 4A:
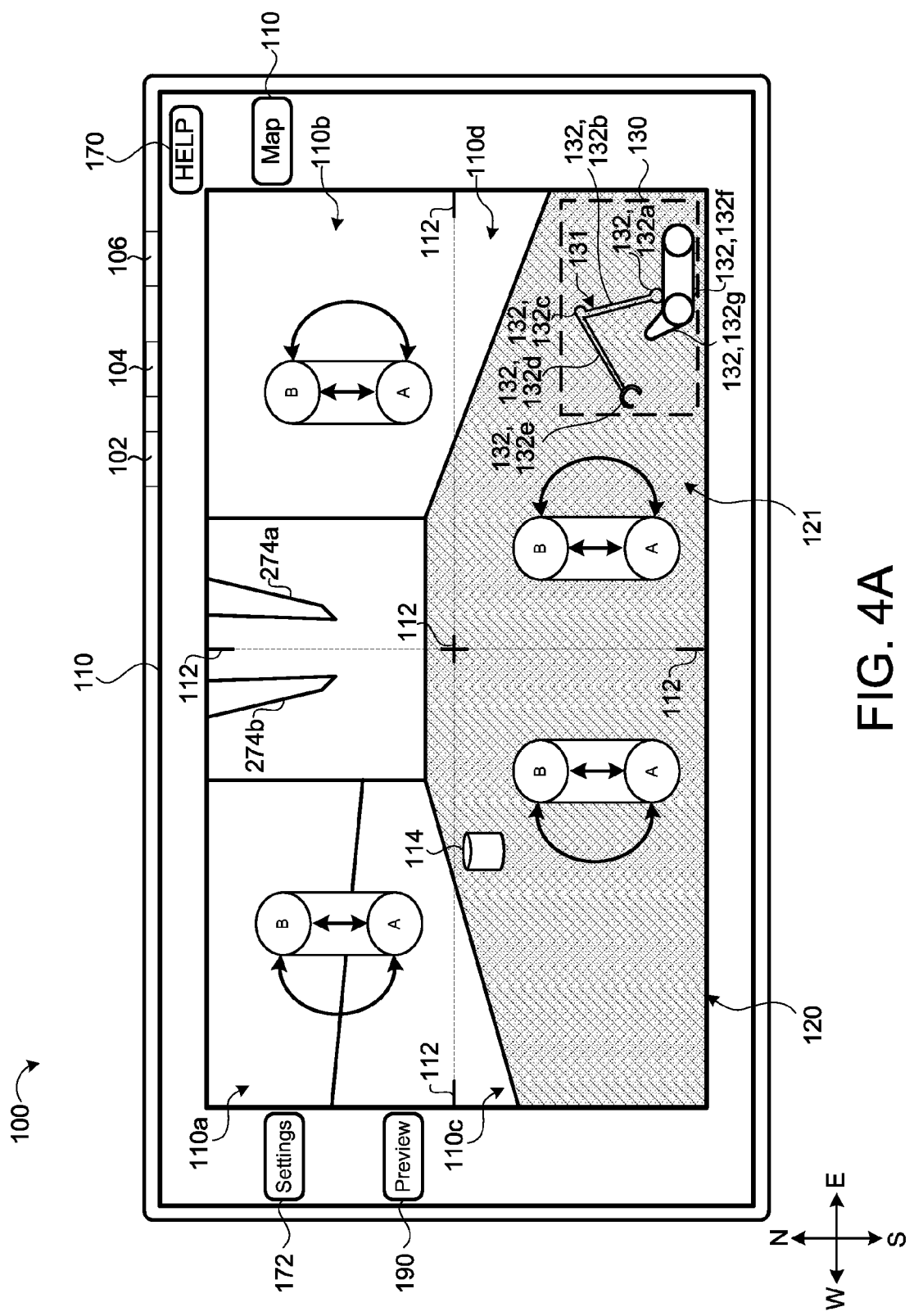
FIG. 4A is a front perspective view of an exemplary operator control unit.
Figure 4J:
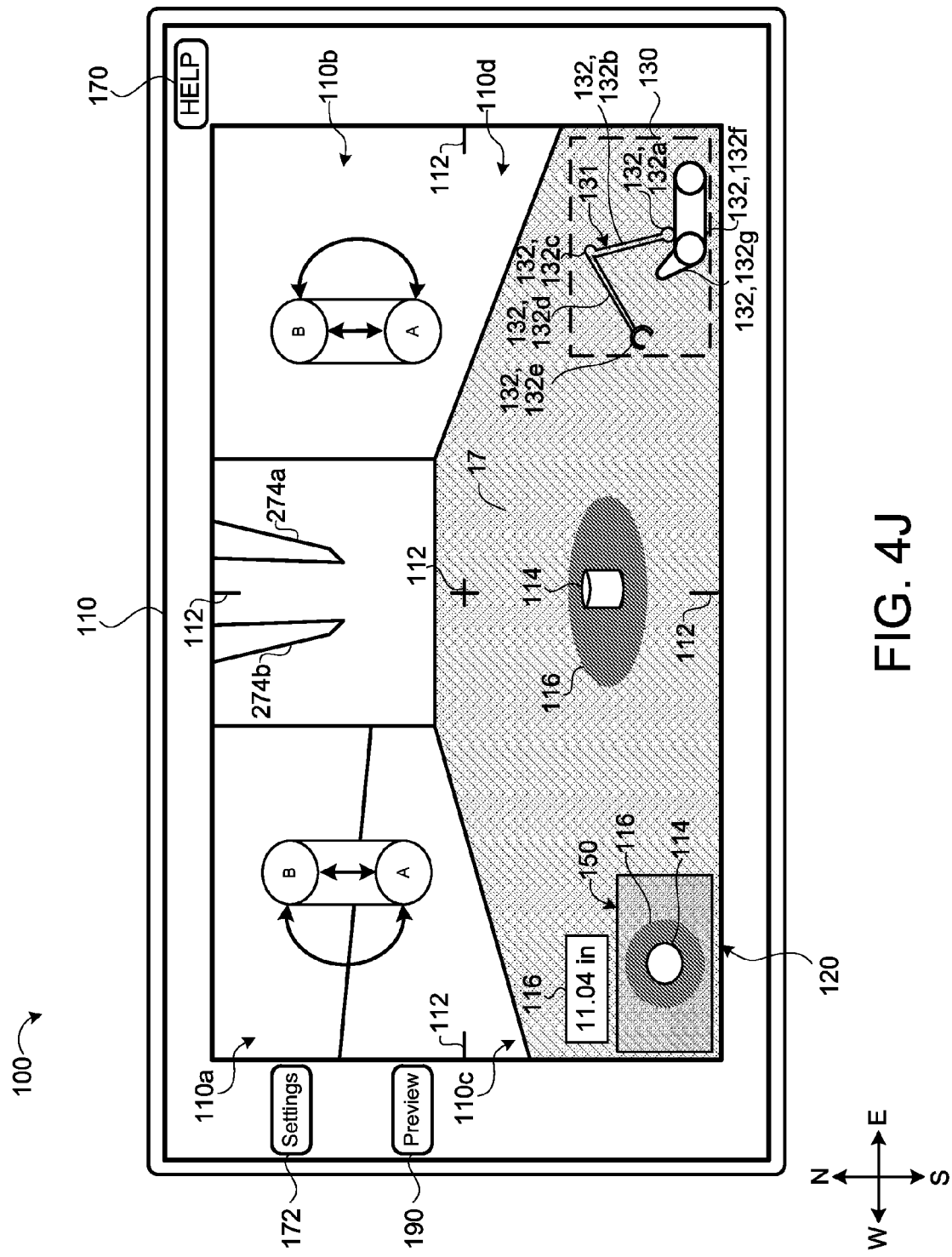
FIG. 4J is a front view of the display of an exemplary operator control unit displaying gripper camera feedback.

Referring to FIG. 4J, in some implementations, the user 10 manipulates the robot 200 to grab an object 114 located at a distance from a current robot 200 location. The user 10 may make such a selection by selecting the object 114 on the display 110. In some examples, the user 10 touches the object 114 twice, indicating that the robot 200 should go to the object 114 to grab it. The controller 400 calculates the resolved motion of the robot 200 to get to the object 114 from its current position and grab the object 114. Resolved motion is the process of detailing a task (e.g., a movement of the robot 200) into discrete motions. For example, when the user 10 manipulates a robot representation 130 to grab an object 114 located at a distance from the robot 200, the robot 200 executes the task while avoiding walls, objects 114, and falling down a cliff (e.g., stairs). The resolved motion algorithms consider input from the sensor system 500 to evaluate how the robot 200 will move from a current robot location to the destination. The resolved motion algorithm produces a continuous motion that connects a starting point of the robot 200 to a destination point of the robot 200 while avoiding collisions with objects 114. Therefore, a user 10, looking at a robot 200 in motion, sees a robot 200 moving across a room seamlessly and effortlessly.

Several robot manipulation gestures are available to the user 10 for manipulating the robot 200. Once the user 10 makes a selection (i.e., robot portion highlighted) of the portion of the robot representation 130 that he/she wants to maneuver, the user 10 may make several gestures based on the type of movement or the end result of the robot position or location. These gestures may include a swipe on the display 110 to indicate a movement of the representation portion. The user swipe may be a short swipe or a long swipe. A long swipe, having a threshold time of swipe greater than a predetermined time, may indicate a greater range of motion or speed of the represented portion than a shorter swipe. Other gestures may include a curved swipe or a straight swipe.

In some examples, the user 10 selects a representation of a robot portion that the user 10 wants to maneuver. Then the user 10 swipes his/her finger(s) along the display 110 to indicate a desired motion for that selected portion. The user 10 removes his/her finger from the display 110 and the robot 200 mimics the movement of the selected representation portions 134. Therefore, the robot 200 executes the movement when the user 10 stops the manipulation of the portion of the robot representation 130. Thus the display 110 updates the movement of the robot representation 130 as the user 10 is manipulating the representation 130 on the display 110; however, the robot 200 executes the motion when the user 10 ceases manipulation of the robot representation 130 and releases his/her fingers from the display 110. The behavior allows the user 10 to see how the manipulation of the robot representation 130 will result before the robot 200 executes the movement.

In some examples, the robot 200 executes the movement of the manipulation of the robot representation 130 in real-time as the user 10 is manipulating a portion of the robot representation 130. Therefore, if the user 10 selects the gripper representation 140 and moves the gripper representation 140, the user 10 may view in real time on the display 110 the video feedback of the gripper 270 moving as the user 10 is moving the gripper representation 140.

Referring back to FIG. 4A, the display 110 may be divided into quadrants 110a-d. In some examples, a visual marker 112 separates the quadrants 110a-d from one another. Each quadrant 110a-d may be independent from the other quadrants 110a-d and may control a different portion of the robot 200. For example, the top quadrants 110a-b may be configured to control the gripper 270, where the first quadrant 110a controls the first tong 274a and the second quadrant 110b controls the second tong 274b. The user 10 may independently control each tong 274a, 274b of the gripper 270, which may be particularly helpful when attempting to grab an object 114. The bottom quadrants 110c-d each controls one drive track 222a, 222b (robot 200).

The quadrants 110a-d therefore include a first quadrant 110a located on a Northwest portion of the display 110, a second quadrant 110b located on the Northeast portion of the display 110, a third quadrant 110c located on the Southwest portion of the display 110, and a fourth quadrant 110d located on the Southeast portion of the display 110. When a user 10 swipes two fingers simultaneously towards a North direction, where one finger is positioned in the third quadrant 110c and the other in the fourth quadrant 110d, with the initial finger position at A and the end position at B, the robot 200 moves in the forward drive direction F. However, if the user 10 moves his/her finger in the third quadrant 110c from position A to position B and either does not move his/her fingers in the third quadrant 110c or rests his/her figure in position A, then the left side of the robot 200 keeps going forward and the right side stops, causing the robot 200 to turn right with respect to the forward drive direction F. If the user 10 swipes his/her finger in the third quadrant 110c from position A to position B, and swipes his/her other finger in the fourth quadrant 110d from position B to position A, then the robot 200 turns to the right with respect to the forward drive direction F. The same applies for turning left. The user 10 may perform other gestures to control the robot 200 into turning. For example, if the user 10 wants to control the robot 200 to turn to the right, then the user 10 may move his/her finger in the fourth quadrant 110d from position B to position A, which causes the robot 200 to make a sharp turn to the right. To make a left turn, the user 10 may make the opposite movement described with respect to making a right turn. In some examples, if the user 10 wants the robot 200 to make a quick stop, the user 10 moves both fingers in the bottom quadrants 110c-d from position B to position A simultaneously. If the user 10 wants to increase the speed of the robot 200 the user 10 may simultaneously move both fingers in the third and fourth quadrants 110c, 110d to the north. In some operational modes, a quadrant's active real estate may enlarge, at times covering the whole screen. In this situation, virtual joysticks associated with a quadrant 110a-d can now be activated from anywhere inside the now enlarged quadrant 110a-d. For example, a user 10 may enlarge the drive quadrant, thus allowing the user 10 to drive the robot 200 using finger gestures on any part of the screen 110.

The gripper 270 may be manipulated similarly, with quadrants 110a-d containing active virtual joysticks having variable sizes. A swipe by the user 10 of both fingers in the first quadrant 110a from A to B results in the movement of the gripper, relative to the camera frame, into the video frame while a swipe in the second quadrant 110b from position B to position A may result in lowering of the robot arm 250. Referring to FIG. 4J, in some examples, the controller 400 calculates a distance from the gripper 270 to a surface/floor 17 and estimates a position of the gripper 270 if it is lowered towards the floor 17 from its current position. The teleoperation software 101 displays on the display 110 a gripper projection 116 of the gripper position on the floor and indicates a height of the gripper 270 from the floor 17. Therefore, if the user 10 lowers the tongs 274a, 274b simultaneously by swiping his/her fingers towards the south from position B to position A in the first and second quadrants 110a, 110b, the robot 200 lowers its gripper 270 towards the gripper projection 116.

In some examples, the user 10 drags the gripper projection 116 to a different location on the floor 17. The gripper projection 116 is moveable on the OCU 100 by a finger touch or stylus drag and drop or mouse click and pointer drag and drop. The robot 200 then moves toward the gripper projection 116 and positions itself so that the gripper projection 116 is accurately positioned below the gripper 270. The user 10 may pinch his/her fingers together in the first quadrant 110a, the second quadrant 110b, or both to manipulate the gripper 270 into grabbing an object 114. The pinches may be oriented in any direction, for example, up and down, sideways, diagonal, etc. Additionally or alternatively, the user 10 may twist his/her fingers (e.g., thumb and forefinger) against the display 110 touch screen to adjust the position of the gripper 270 to better grab the object 114. The height adjustment and twisting may be done simultaneously. Moreover, the user 10 may move two elements of the robot 200, 300 simultaneously if their respective controls are in different quadrants 110a-d. The controller 400 may calculate a size of the object 114 to determine if the object 114 has a size that the gripper 270 is capable of holding. If the controller 400 determines that the object 114 is too large or too small to be grabbed, the controller 400 may issue a command to display a message on the OCU 100 informing the user 10 that the object 114 is too small or too large for the tongs 274a, 274b to grab.

Figure 4K:
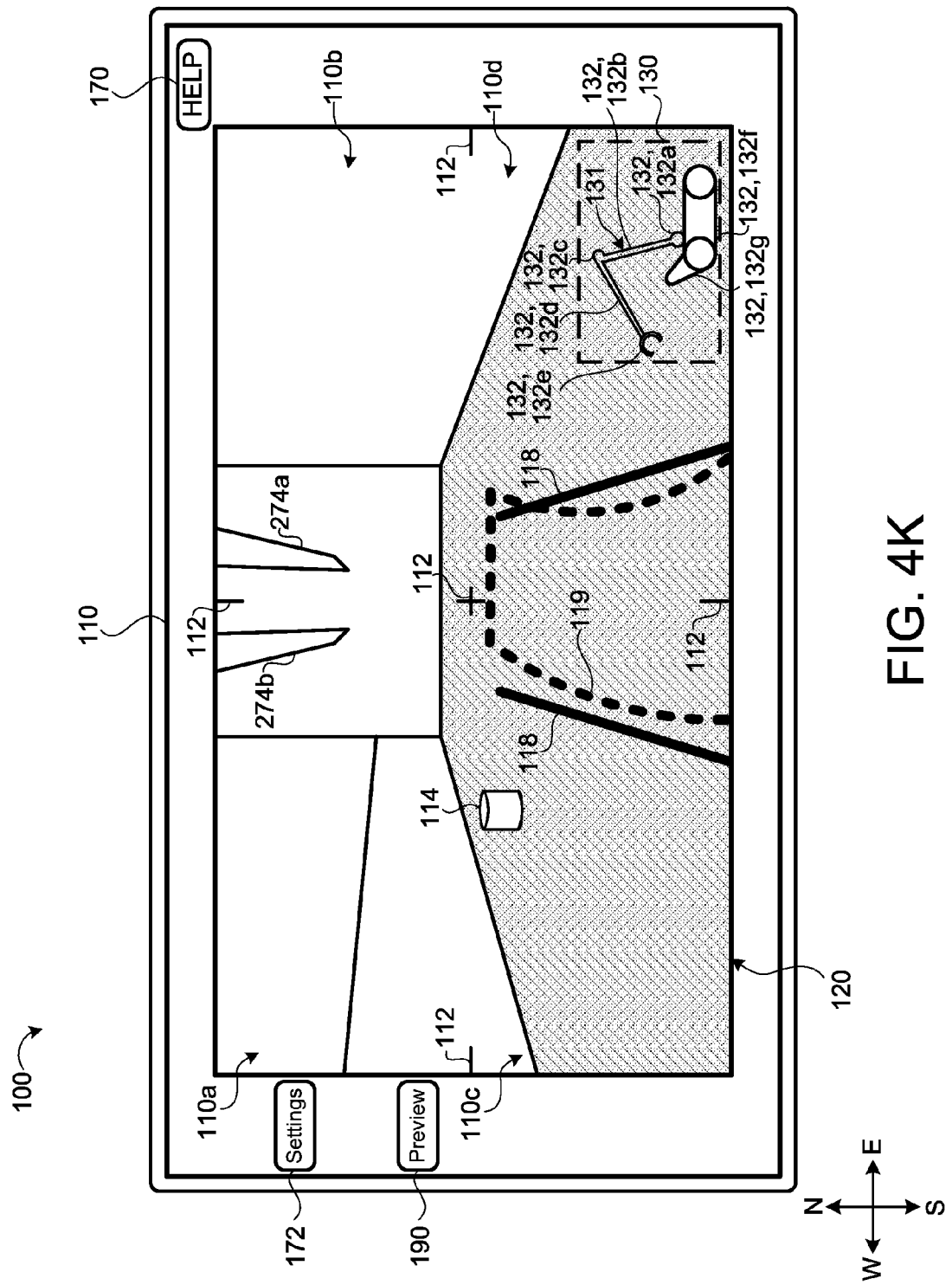
FIG. 4K is a front view of an exemplary operator control unit displaying drive and turn lanes.
Figure 4L:
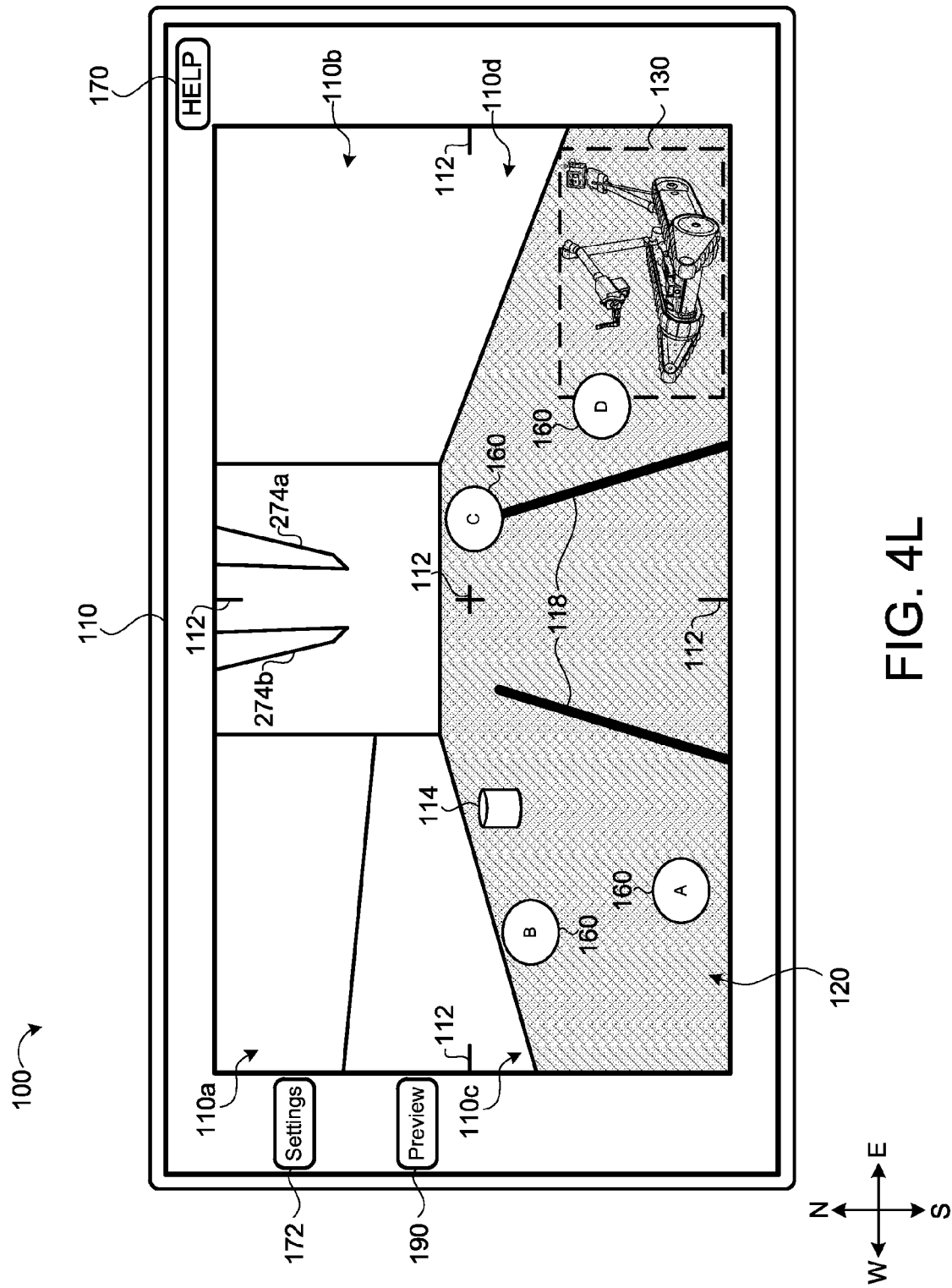
FIG. 4L is a front view of an exemplary operator control unit displaying waypoints selected that a robot traverses and a three dimensional representation of a robot.
Figure 4M:
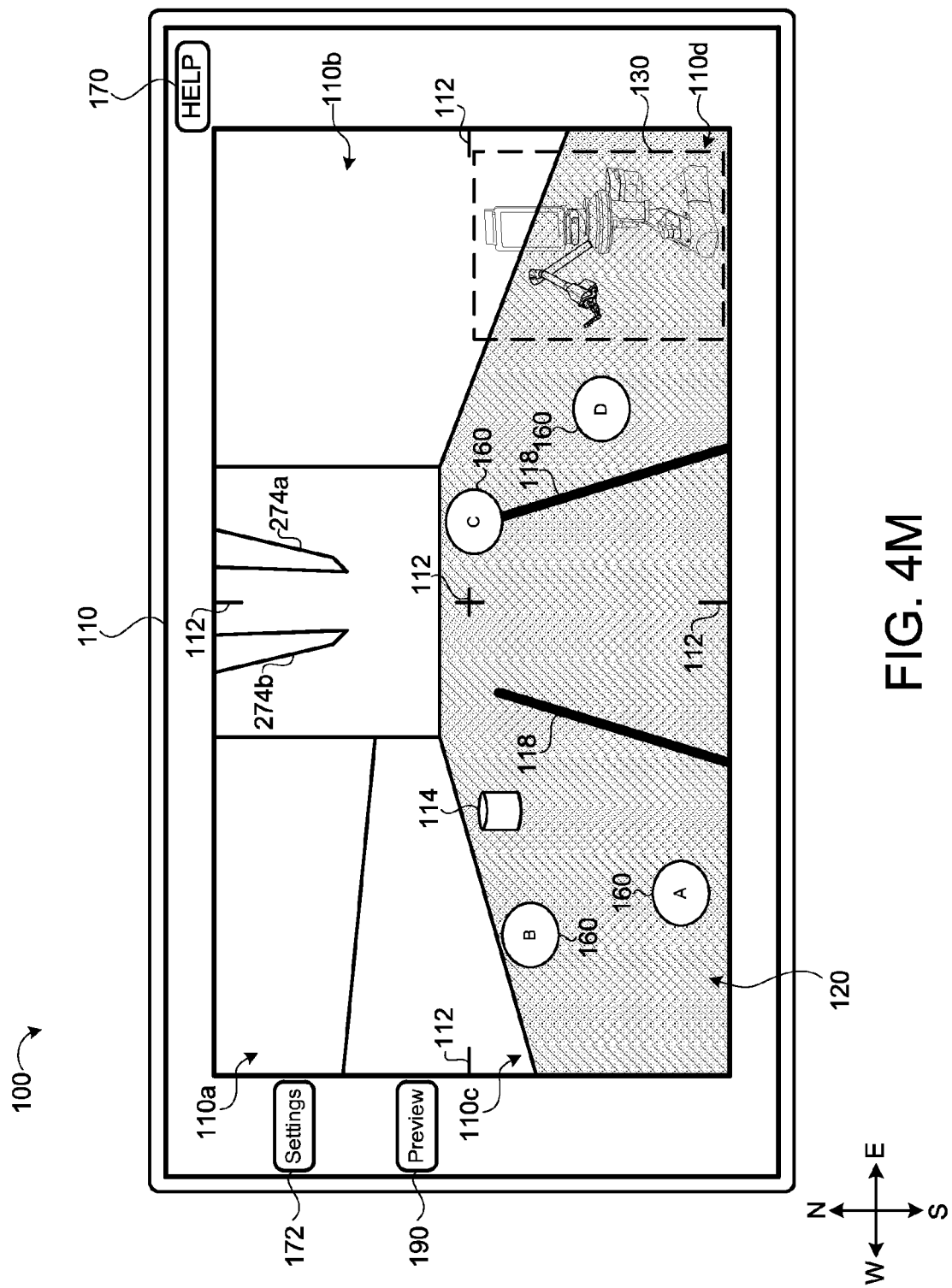
FIG. 4M is a front view of an exemplary operator control unit displaying an exemplary augmented image.
Figure 4N:
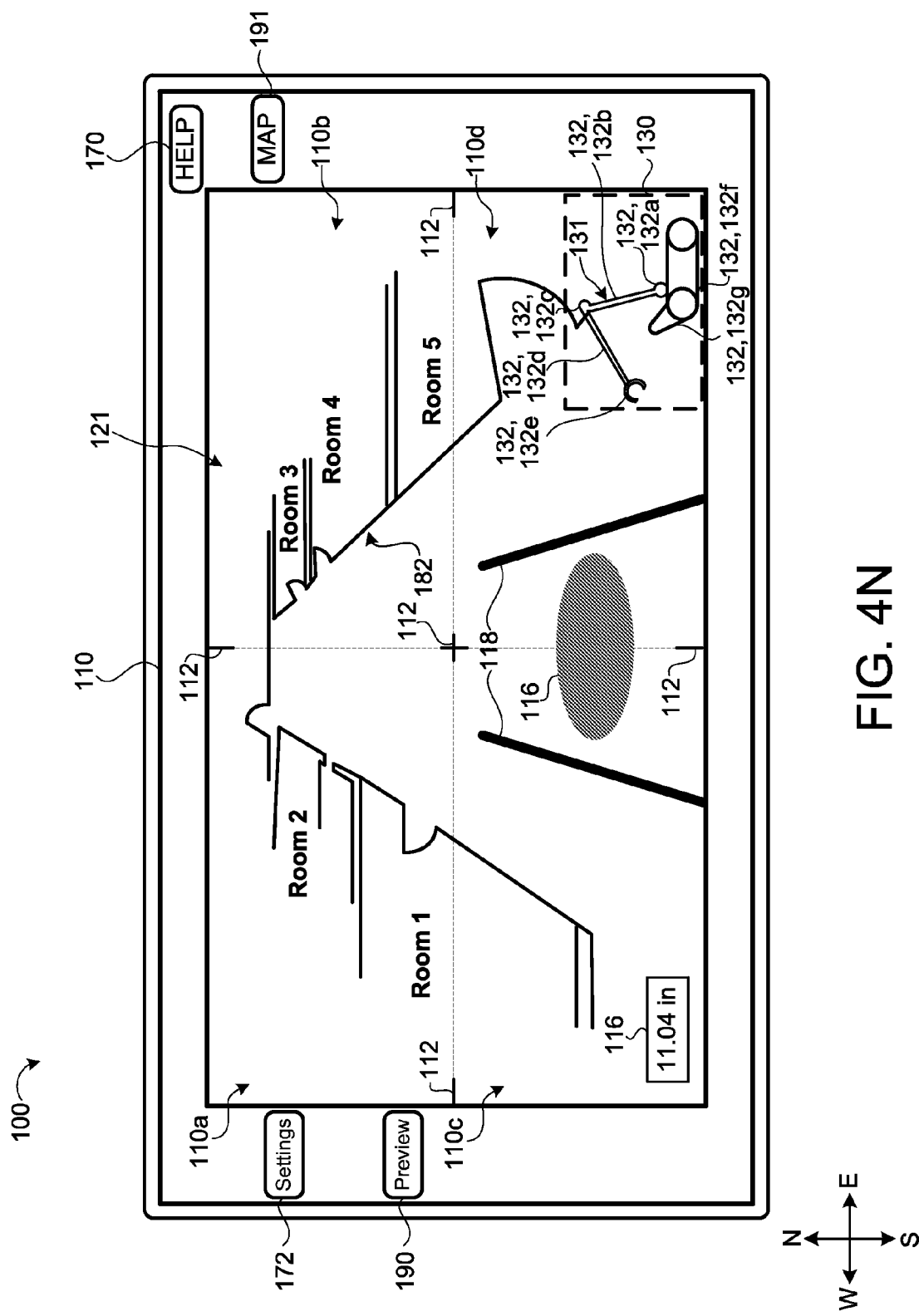
FIG. 4N is a front view of an exemplary operator control unit displaying an exemplary augmented image without the video feed.

Referring to FIG. 4K, in some examples, the teleoperation software 101 displays drive lanes 118 on the display 110. The drive lanes 118 provide the user 10 with a better view of the trajectory toward which the robot 200 is driving. In some examples, when the robot 200 is making a right or a left turn, additional turn lanes 119 are displayed indicating where the robot 200 is heading as it turns (as shown in FIG. 4K, the robot 200 is making a right turn).

In some implementations, the user 10 swipes his/her finger within the bottom quadrants 110c-d from a south position to a north position indicating that the robot 200 drives in a forward path. As the robot 200 is driving, the user 10 may select a portion 132 of the robot representation 130 and maneuver the selectable portion 132 to move in a specific manner. The robot 200 may simultaneously receive the two user commands of driving and moving a portion of its body.

Referring to FIGS. 2A, 2B, and 4J, in some examples, where the gripper 270 includes a camera 272, the augmented image 121 includes a video feed from the gripper camera 272 displayed in a separate camera window 150. The separate camera window 150 shows the video feedback as the gripper 270 is approaching the object 114. The camera window 150 may display the projected target 116 in the video feed.

Referring to FIG. 4L, in some implementations, the user 10 may indicate one or more waypoints 160 on the display 110. The robot 200 follows the waypoints 160 in the order that the user 10 touched the display 110. For each waypoint 160, the controller 400 determines if the waypoint 160 is a valid waypoint 160, which means that the waypoint 160 is positioned on a traversable surface. For example, a valid waypoint 160 is on a surface that is not a wall or a cliff. If the waypoint 160 is valid, then the controller 400 issues drive commands for the robot 200 to head towards the waypoint 160. If the waypoint 160 is not a valid waypoint 160, which means the waypoint 160 is on a wall or down a cliff, then the controller 400 may issue one of two commands: the first one allowing the robot 200 to drive to a location closest to the waypoint 160; or the second one to skip that waypoint 160 and move to the next waypoint 160. The OCU 100 may display the waypoints 160 on the video feed and, while sensors can improve the ability to identify valid waypoints 160, the controller 400 is able to navigate to waypoints 160 that use no other sensor data other than a derived ground plane of the video feed, as calculated by the controller 400.

In some examples, the display 110 includes a help button 170. When the user 10 touches the help button 170, the controller 400 provides the user 10 with a step by step indication of how certain features may be executed. In some examples, a tutorial is available to help the user 10 learn how to maneuver and manipulate the robot representation 130 using the OCU 100. The help button 170 provides the user 10 with different help options such as, but not limited to, more access to specific OCU functionality, or allowing a separate user 10 to view and remotely access functionality of the OCU 100.

In some examples, the teleoperation software application 101 renders on the display 120 a setting button 172. When the user 10 touches the settings button 172, the user 10 has access to several settings that include, but are not limited to, selecting the robot 200, selecting a user profile associated with the robot 200, brightness controls, selecting the position of the robot representation 130, selecting the position of the camera window 150, selecting whether execution of the robot manipulation occurs upon removing finger off the display 110 or as the finger is moving on the display 110.

Referring to FIGS. 5A-6B, in some implementations, the teleoperation software application 101 displays a hybrid three-dimensional image map 180 (hybrid map) on the display 110 as part of the augmented image 121. The hybrid map 180 may be a combination of the remote view 120 displayed on the display 110 and a layout map 182, such as the 2-D, top-down map displayed in the map view 184. In some examples, the layout map 182 is a map stored in memory on the controller 400, the cloud 22, or downloaded to the robot 200 via the network 20.

Figure 5A:
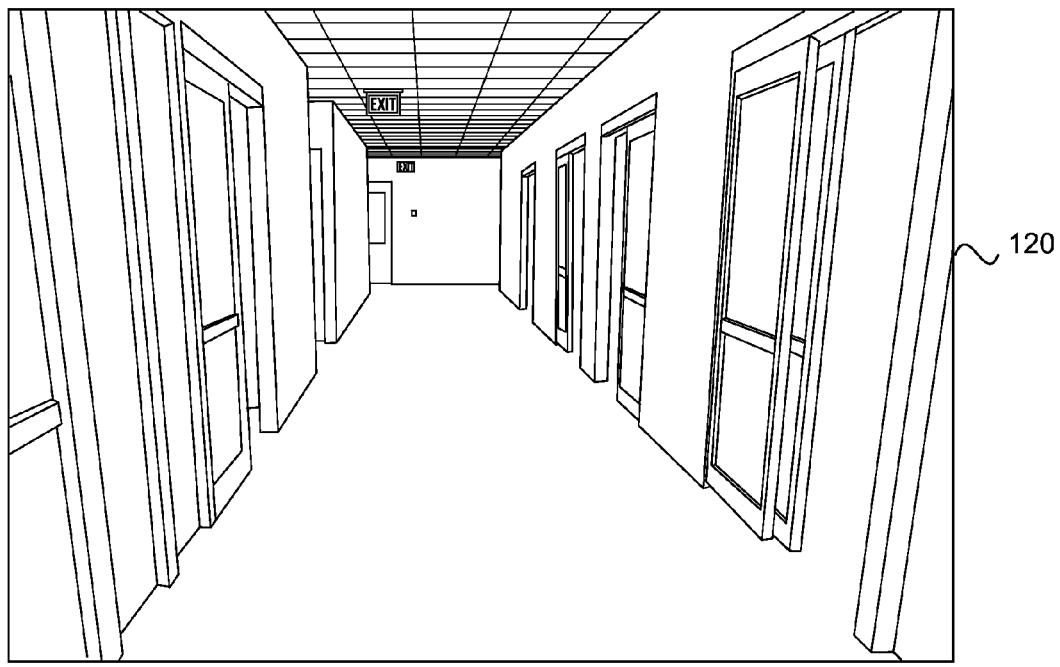
FIG. 5A is schematic view an exemplary remote video view from a robot positioned in a hallway.
Figure 5B:
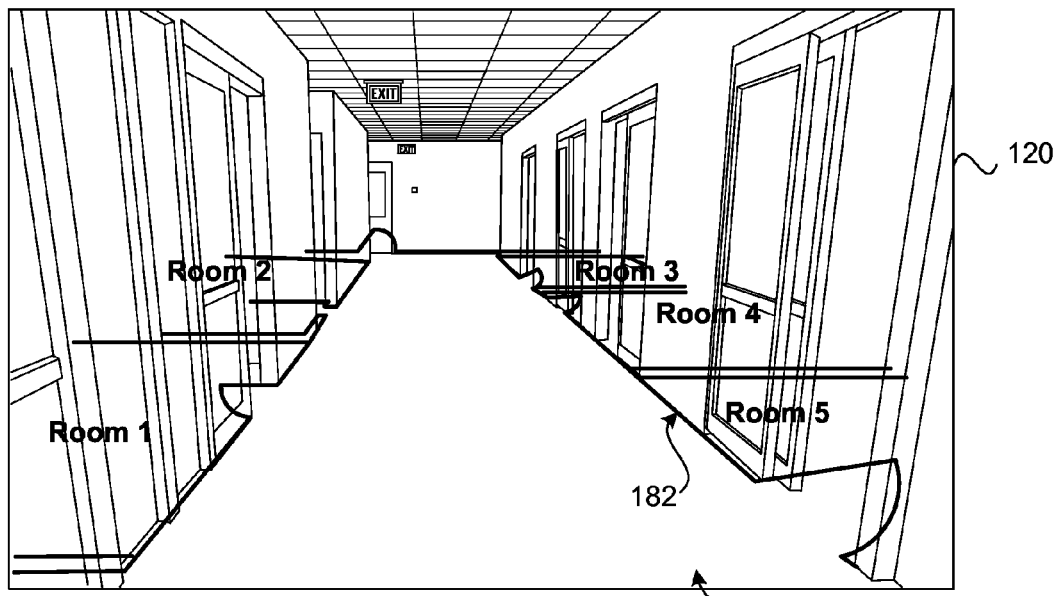
FIG. 5B is a schematic view of an exemplary hybrid map incorporating the remote video view shown in FIG. 5A, together with a map indicating room numbers.

FIG. 5A illustrates a remote video feed view 120 that a user 10 may see when the robot 200 is positioned in a hallway. FIG. 5B illustrates an augmented hybrid map 180 displayable on the display 110, in which the layout map 182 is partially overlaid and modified to fit the remote view 120, indicating the room numbers and/or room types of the areas in the field of view of the robot 200. The user 10 may maneuver and manipulate the robot 200 based on the hybrid map 180, which may also be a part of the augmented image 121. This augmented view helps the user 10 to better navigate the robot 200 due to the accurate representation of dimension of the room that the hybrid map 180 provides because it represents both a perspective live remote video view 120 and a map 184.

To provide the hybrid map 180, the teleoperation software application 101 may determine a distortion between the remote view 120 and the layout map 182 using recorded robot map locations of a robot map 184 and corresponding layout map locations and then applying the determined distortion to fit the layout map 182 to the remote view 120. In some implementations, determining the distortion includes determining a scaling size, origin mapping, and rotation between the layout map 182 and the remote view 120, for example, by applying an affine transformation to the determined scaling size, origin mapping, and rotation.

Referring to FIGS. 1, 4A, and 6A-6E, in some implementations, the OCU 100 provides a preview button 190 that causes the display of a rendered preview view 192a on the display 110, a dedicated separate window, or some other window. While commanding the robot 200, the user 10 may invoke a preview button 190, which causes the robot 200 to stop moving physically, while the teleoperation software application 101 generates and displays a rendered preview view 192a providing a perspective view of a proposed robot action, such as a drive path, as if the robot 200 were continuing to move, e.g., along its drive path. This may be accomplished by using the map data, such as location of walls, and constructing a perspective "virtual reality" view based on the virtual location of the robot 200. The user 10 may command the robot 200 by manipulating the robot representation 130 and/or other inputs (e.g., touch gestures) on the OCU 100 and then view a preview (e.g., a simulation) of what the robot 200 should do, if the command(s) is/are executed on the robot 200.

In some implementations, the preview button 190 of the OCU 100 provides a rewind function. The rewind causes all robot motion prior to pressing the button 190 to be done in reverse. The reverse works either as a slider in time or for a duration of time proportional to the length of a button press event. For example, if the user 10 moved joints of the robot 200, 300 and the chassis 210 in a certain sequence, the rewind button 190 provides the capability for those sequences to be done in reverse without the user 10 having to control each degree of freedom. For example, reaching an arm 250 in through a car window is a delicate process and is very difficult to get the arm 250 out, especially if there is no reverse camera view. The rewind capability allows the user 10 to not need the reverse camera view to get the arm 250 safely out the window.

In some examples, the telepresence software application 101 uses the layout map 182, the robot map, and/or stored image data to construct the preview view 192a. For robot systems using a cloud computing service 22, the telepresence software application 101 and optionally the robot 200 may communicate with the cloud computing service 22, which may construct the preview view 192a based on stored image data, the 3-D map, and/or the 2.5 height map and then provide the preview view 192a for rendering in the display 110. This implementation, allows the telepresence software application 101 to leverage the scalable computer processing and data storage capability of the cloud service 22 (e.g., the cloud service 22 can elastically scale up to process the data and then scale down afterwards), thus reducing the processing and memory requirement for a computing device executing the telepresence software application 101.

Figure 6A:
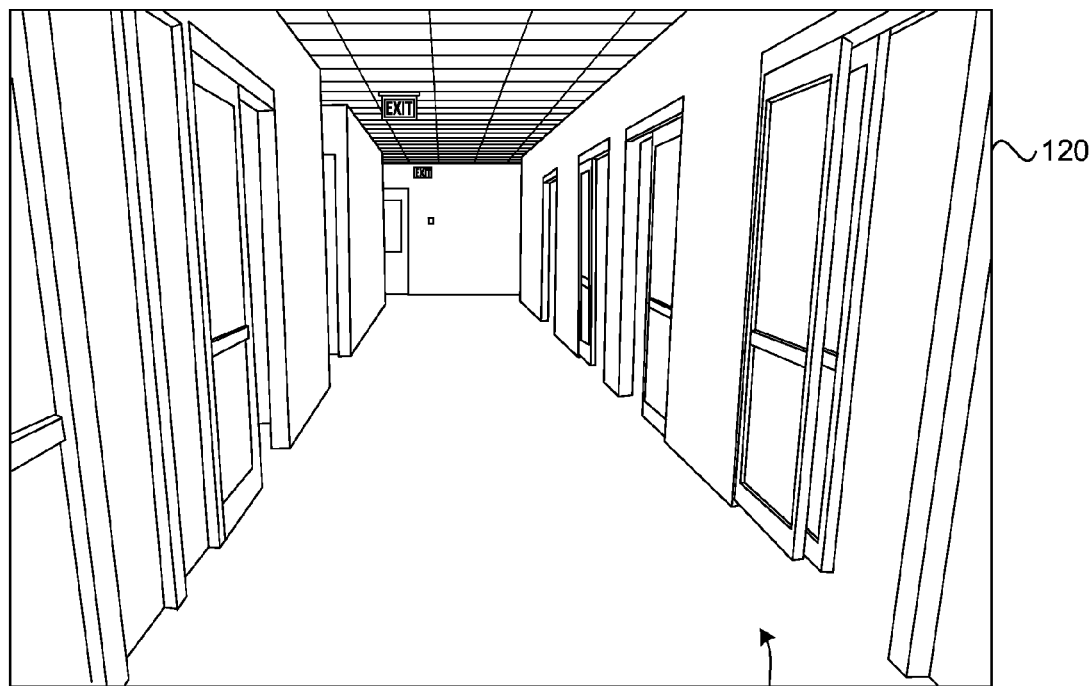
FIG. 6A provides an exemplary remote view of a remote video window of a telepresence software application.
Figure 6B:
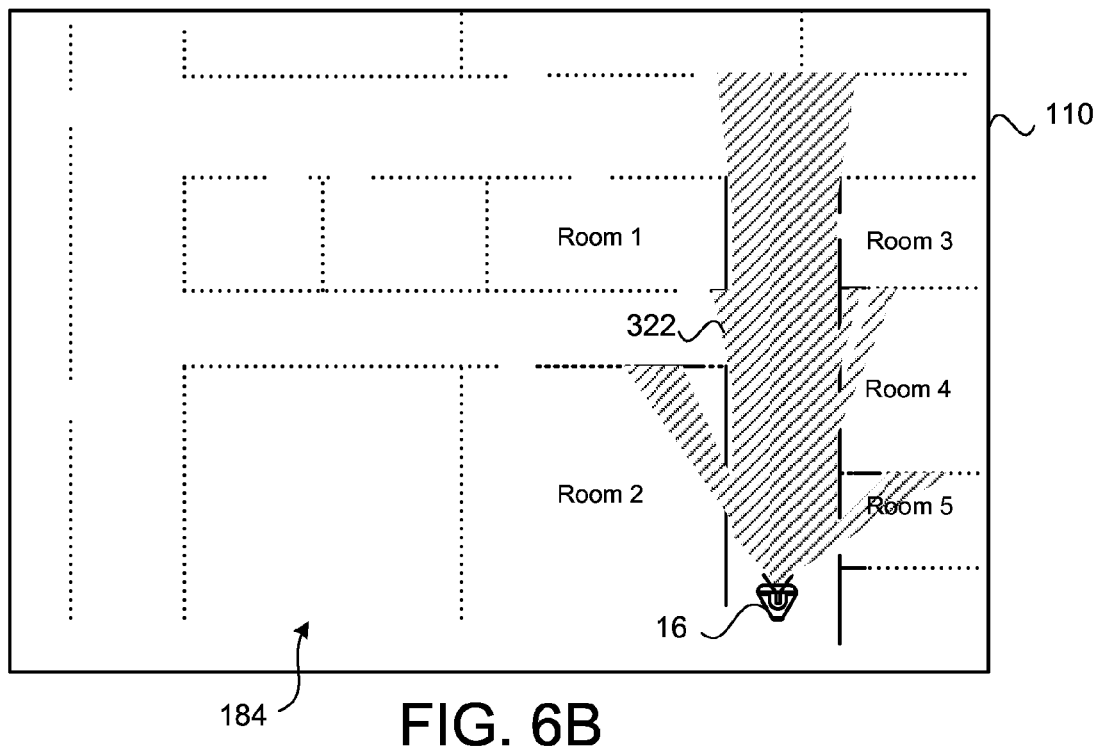
FIG. 6B is a schematic view of an exemplary map of the area shown by the remote view of FIG. 6A.
Figure 6C:
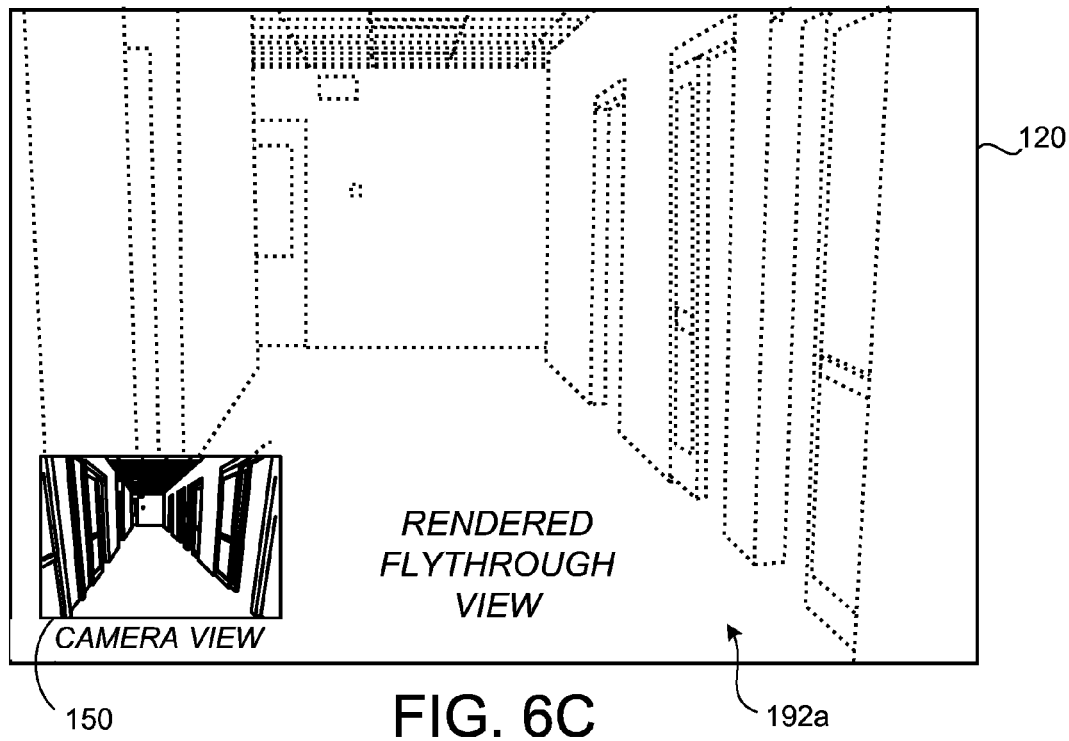
FIG. 6C is a schematic view of an exemplary preview view of a telepresence software application.

FIG. 6A illustrates an exemplary remote view 120 captured by the robot cameras 218, 219, 262, 362. FIG. 6B illustrates a complimentary map 184 that may be displayed on the display 110 when the user 10 selects a map button 191. The map 184 provides the current location of the robot 200 as denoted by a robot icon 16 along with a camera field of view 322 for a robot camera 218, 219, 262, 362. In some implementations, a camera window 150 continues to display the remote view 120 from the robot camera 218, 219, 262, 362 in a picture-in-picture window, for example, placed in a corner of the OCU display 110.

Figure 6D:
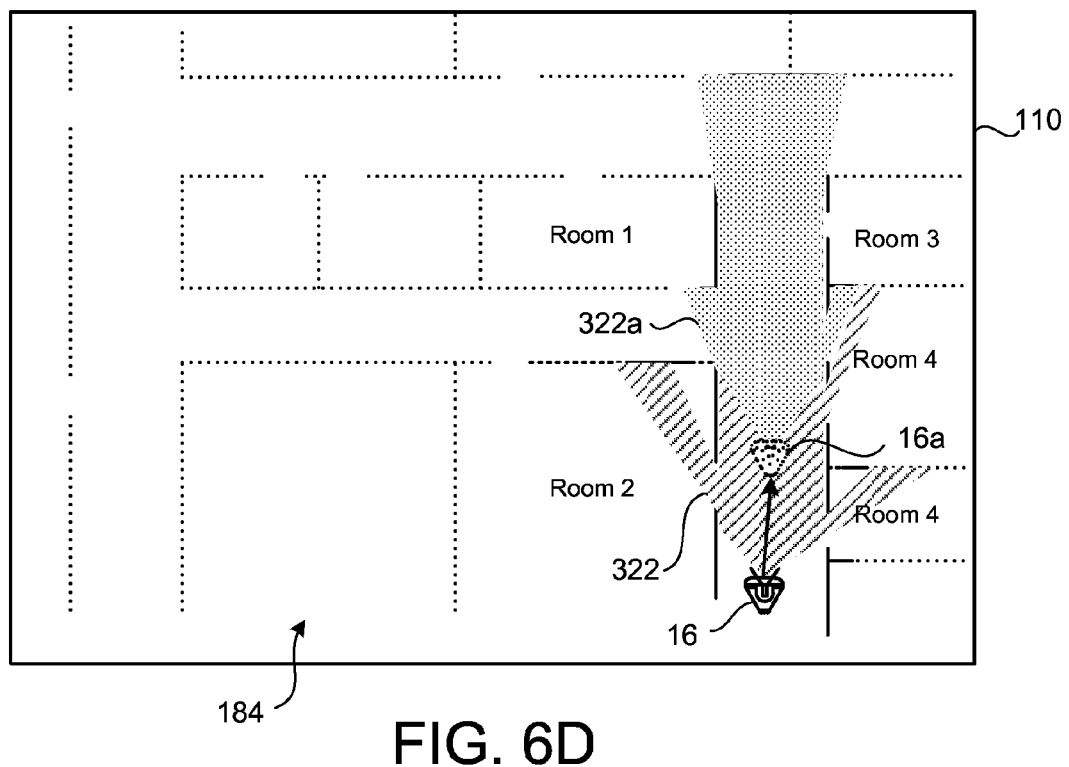
FIG. 6D is a schematic view of the map shown in FIG. 6B with a robot icon and a corresponding camera field of view.
Figure 6E:
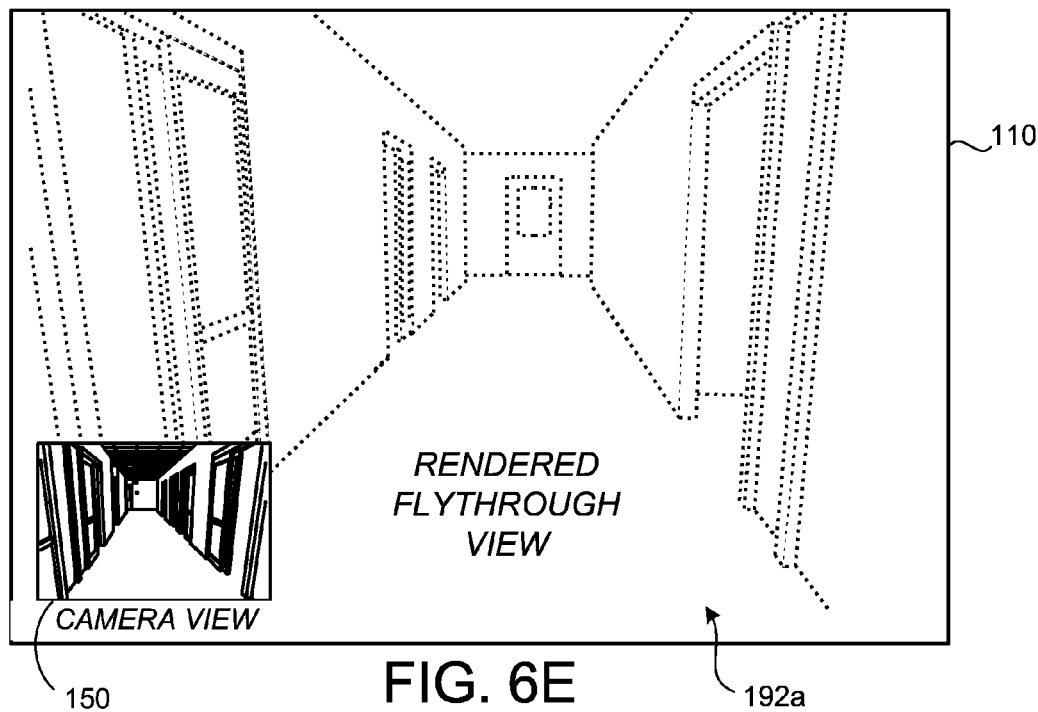
FIG. 6E is a schematic view of an exemplary preview view of a telepresence software application.
Figure 6F:
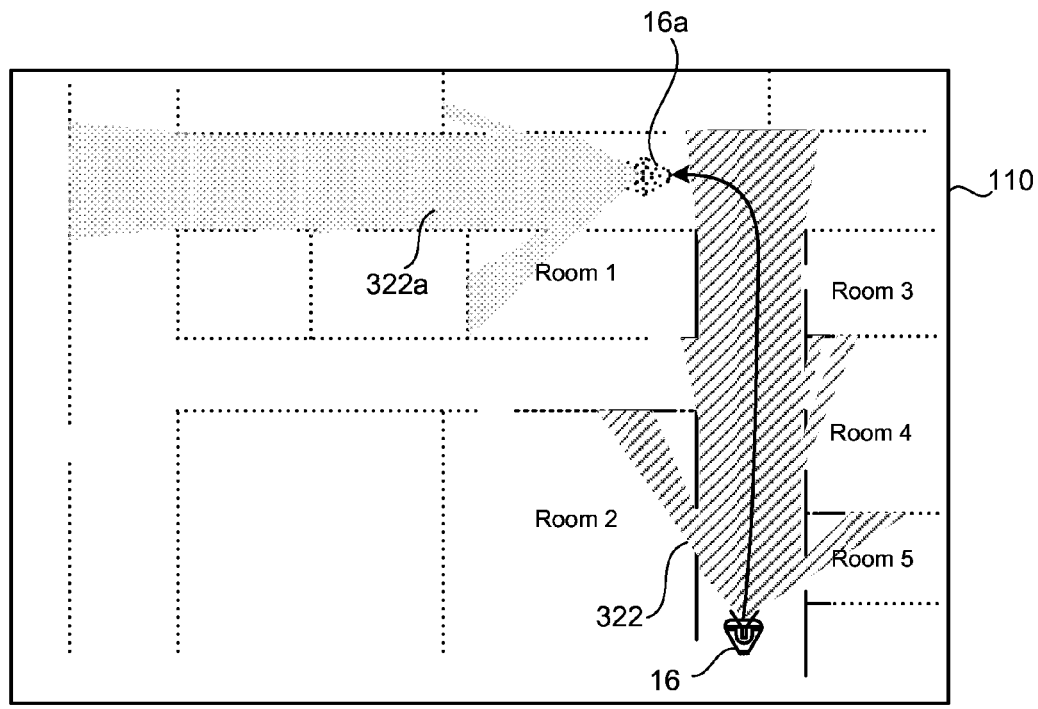
FIG. 6F is a schematic view of the map shown in FIG. 6B with a robot icon and a corresponding camera field of view.

FIGS. 6D and 6F provide exemplary maps 184 displayed on the display 110 when the user 10 selects the map button 191 (FIG. 4N). While executing the preview command, the telepresence software application 101 may render the robot icon 16 at the robot's current location along with the robot's camera field of view 322. In addition or alternatively, the telepresence software application 101 may render in the map 184 a virtual robot icon 16a moving along a preview path along with a projected preview camera field of view 322a.

In some implementations, as the user 10 drives the robot 200 along a corridor, the user 10 may invoke the preview mode by selecting the preview button 190 on the display 110. For example, at a location 50 feet away from a turn in the corridor, the user 10 may invoke the preview button 190, causing the generation of a preview view 192a and stopping further movement of the robot 200 along the corridor. The user 10 may continue, however, to virtually move the robot 200 in a preview mode. The OCU display 110 may display the preview view 192a (e.g., a 3-D model) of the same corridor at the same position. As the user 10 drives forward in the preview mode, continues 50 feet, turns left, and continues driving, the user 10 can see the location of rooms and other corridors along the way in the 3-D model/preview view 192a. In some examples, for the first 30 feet of "virtual" driving, the telepresence software application 101 displays a blend of the actual view (from the stationary physical robot, further magnified and perspective-warped to match the virtual location) and the 3-D model/preview view 192a.

Figure 7A:
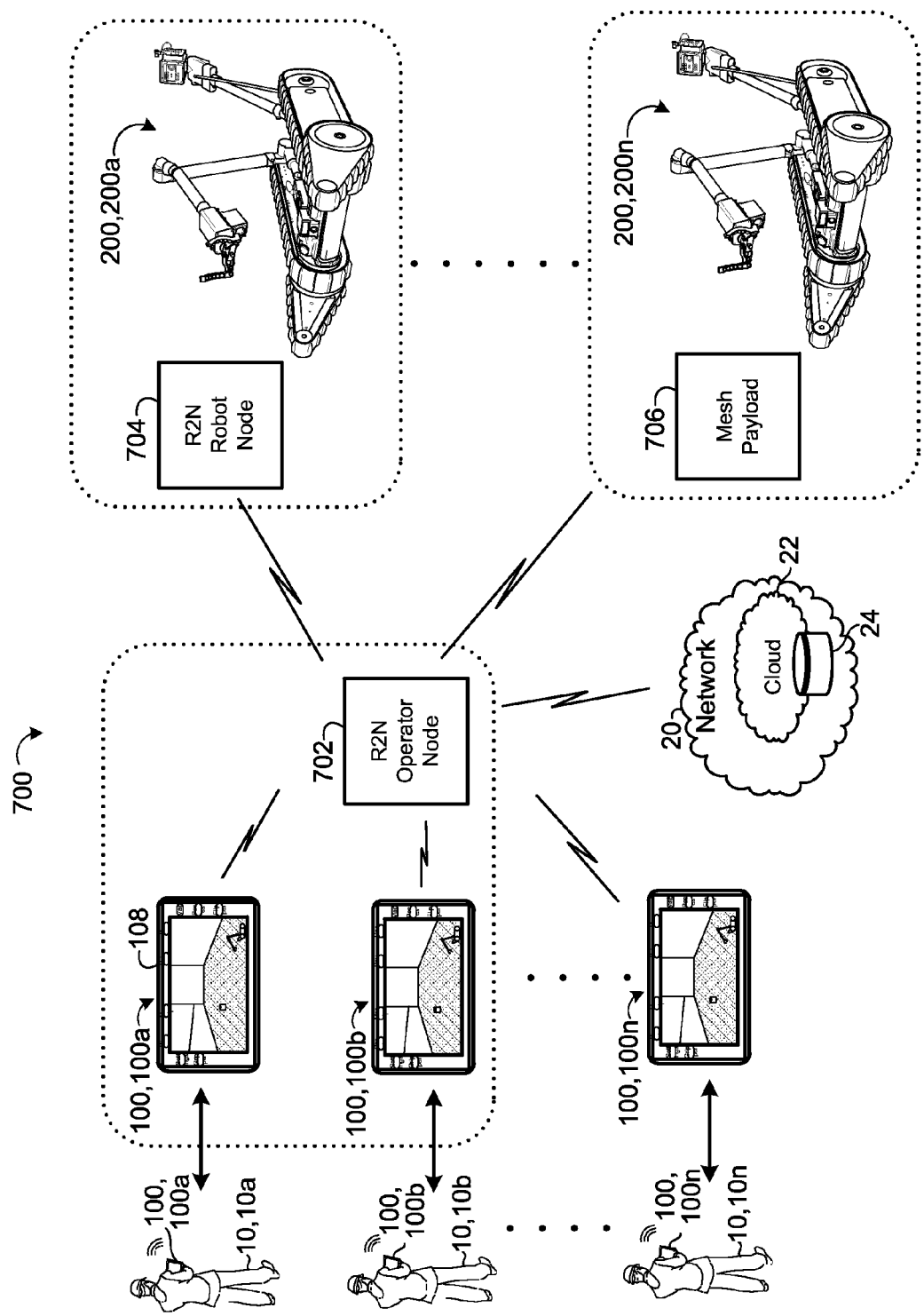
FIGS. 7A-7C are schematic views of exemplary robot systems.

Referring to FIG. 7A, in some implementations, a communication system 700 allows for communication between one or more users 10a-10n and one or more robots 200a-200n. The communication system 700 includes the network 20 and multiple robots 200a-200n wirelessly communicating with the network 20 via one or more communication nodes 702, 704, 706. The communication node 702, 704, 706 is a networking device that forwards data packets between computer networks. When the communication node 702, 704, 706 receives a data packet, it determines the ultimate destination (OCU 100) of the data packets. The communication nodes 702, 704, 706 communicate with one or more other communication devices 702, 704, 706, 720 via the network 20.

The one or more users 10a-10n may simultaneously communicate with the one or more robots 200-200n. As shown in FIG. 7A, a first user 10a may communicate with first and second robots 200a, 200n. The first user 10a may use a first OCU 100a to teleoperate the first and second robots 200a, 200n from a distance. As previously described, the robots 200a, 200b may not be within the field of view of the user 10a, therefore, the OCU 100 is capable of communicating over the network 20. In some examples, the second user 10b may take control of the first robot 200a from the first user 10a (e.g., based on a user priority policy implemented by the OCUs 100a-100n). The second user 10b uses his/her OCU 100b to teleoperate the first robot 200a from a distance. Control of the first robot 200a may be based on a hierarchy of users 10 having priority permission to control the first robot 200a. For example, the first user 10a may be the main user 10a of the first robot and the second user 10b may be the main user of the second robot 200n. In some examples, if the first user 10a is controlling the second robot 200b, and the second user 10b decides to control the second robot 200b, the second user 10b may take control of the second robot 200b, since the second user 10b is the main user 10b of the second robot 200b. However, if the second user 10b was not the main user 10b of the second robot 200b, then the second user 10b may not be able to take control of the second robot 200b. Additionally or alternatively, the OCUs 100a-100n can implement other user control policies as well, such as a user priority based on a rank within an organization.

In some implementations, a third user 10c having a third OCU 100c can use the third OCU 100c to observe actions or other users 10 or two observe robots 100. For example, the third user 10c may select, via the display 110 of his/her OCU 100c, to view the screen 110 of the first user 10a, who may be controlling two robots 200a, 200b. In another example, if the first user 10a is controlling the first robot 200a, and the third user 10c selects (using the third OCU 100c) the first robot 200a, then the display 110 of the third OCU 100c of the third user 10c may mirror the display 110 of the of the first user 10a, but not necessary allow operation of the first robot 200a.

In some implementations, a user 10 teleoperating one or more robots 200 speaks a different language than people having contact with the robot 200. The user 10 may want to deliver a message from the user 10 to the people. Therefore, the OCU 100 may include a microphone 108 (FIG. 7A) configured to convert sound from the user 10 into electrical or digital signal that is transmitted to the cloud resource 22 for translation. The cloud resource 22 may send the translated audio to the robot 200 associated with the user 10, i.e., being controlled by the user 10, and/or to other OCUs 100. Therefore, the teleoperation software application 101 is configured to convert a user's speech into text in a first language, then translate the first language to a second language, and finally convert the text of the second language to speech, allowing the robot 200 to play the translated speech to people around the robot 200 and/or to other OCUs 100. In some examples, the user 10 types a message via the OCU 100 and the teleoperation software application 101 translates the inputted text via the cloud 22 before allowing the robot 200 to play a recording of the translated text or display the translated text on a display of the robot 200.

Figure 7B:
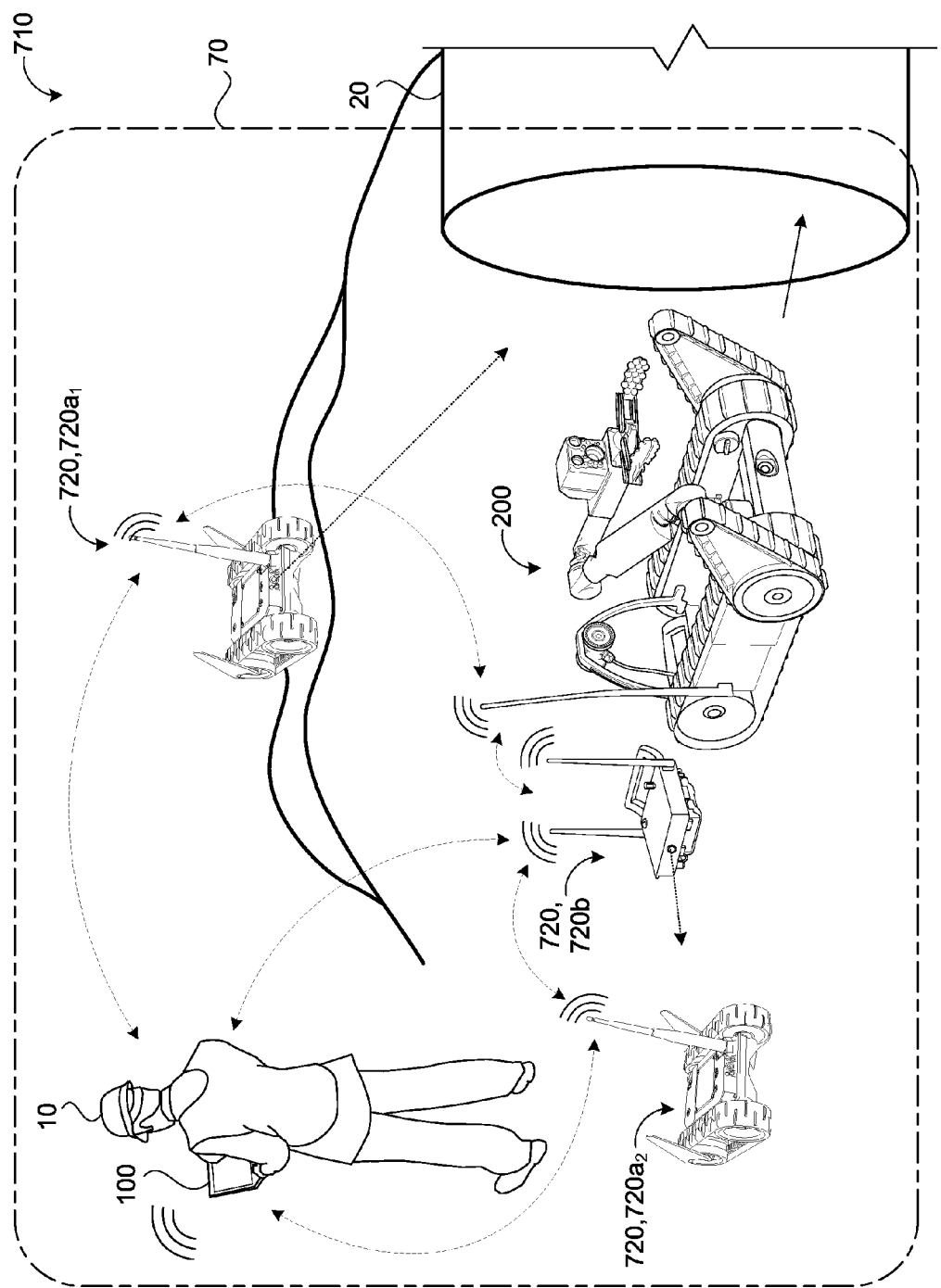
Figure 7C:
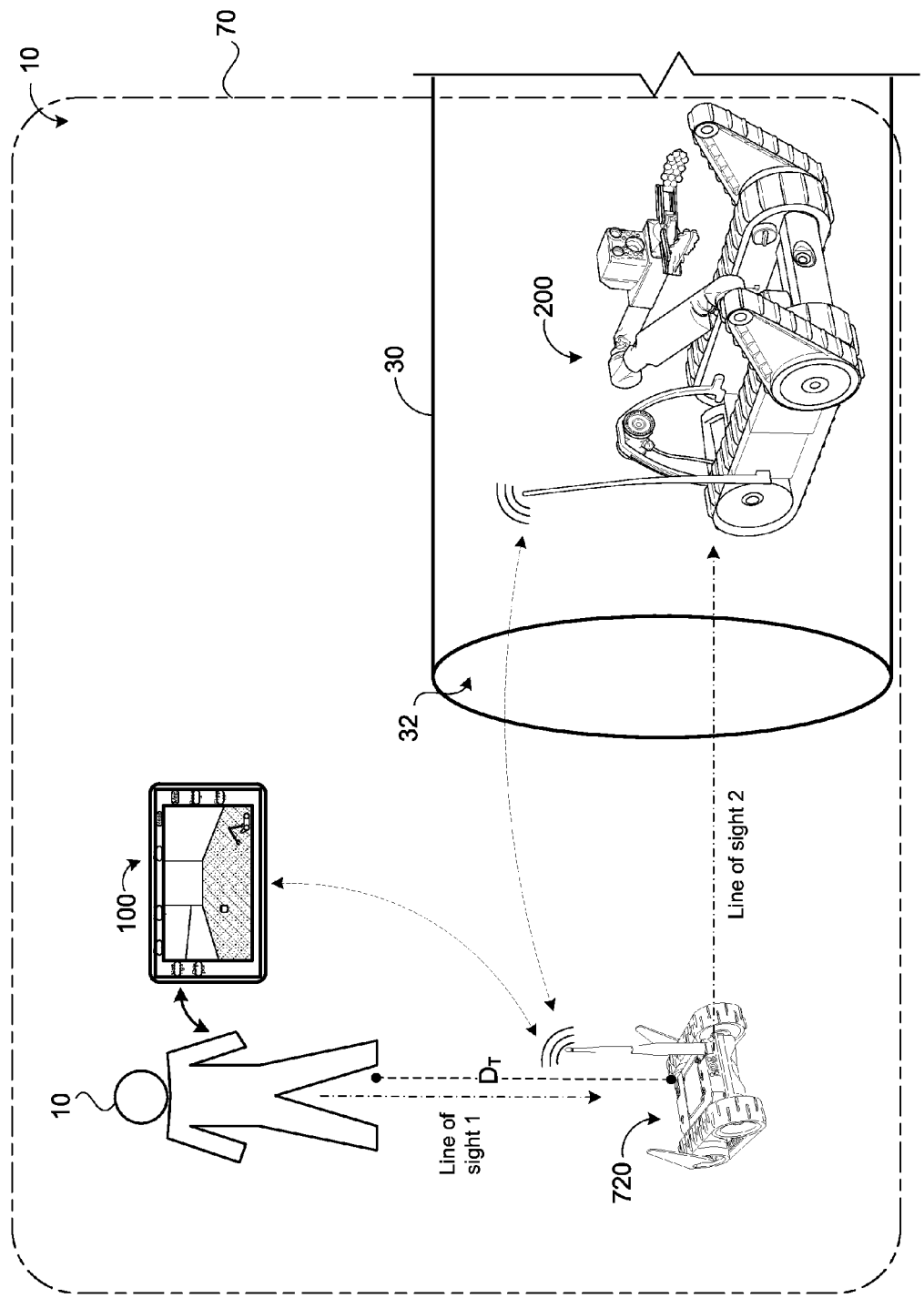

In some implementations, if a remote operator 10 wants to drive the robot 200 into a culvert, behind an object, or into a room or underground, the signal may be severely attenuated. Referring to FIG. 7B, in some implementations, a robot system 710 includes an operator control unit (OCU) 100 in communication with a mobile robot 200. The operator control unit 100 allows a remote operator 10 to partially or fully operate the robot 200 within a threshold communication range. In some implementations, one or more repeaters 720 extend the communication range between the OCU 100 and the robot 200. In some examples, as shown in FIG. 7C, a repeater 720 can be positioned adjacent the opening 32 of a culvert 30, allowing continued communication between the OCU 100 and the robot 200 while its driving in the culvert 30. The repeater 720 can therefore extend a communication network between the OCU 100 and the robot 200, allowing relatively longer range missions and missions into signal attenuating situations (e.g., into tunnels 30 and buildings and around signal attenuating structures). As indicated in FIG. 7C, a first line of sight 1 from the OCU 100 to the repeater 720 may not be parallel to or collinear with a line of sight 2 from the OCU 100 to the mobile robot 200. In some implementations, no line of sight exists between the OCU 100 and the mobile robot 200. The mobile robot 200 may be in communication with the OCU 100 via the repeater 720 positioned therebetween and having a direct first line of sight 1 to the OCU 100 and a direct second line of sight 2 to the mobile robot 200.

In some implementations, when the robot 200 maneuvers into a tunnel 30 (e.g., a culvert, a cave, etc.), behind an obstacle, or into a building, the communication signal between the OCU 100 and the robot 200 may become attenuated, disrupting the communication therebetween. One or more repeaters 720 may be deployed to increase an effective communication range between the OCU 100 and the robot 200. The repeater 720 can be an electronic device that receives a signal and retransmits it at a higher level or higher power, or onto the other side of an obstruction, so that the signal can cover longer distances. The repeater 720 may receive and transmit analog and/or digital signals. Each repeater 720 acts as a transceiver by receiving signals from the OCU 100 and transmitting the signals to the robot 200 and vice versa. Moreover, the repeater 720 may receive and transmit signals from other repeaters increasing a communication network 70 between the OCU 100 and the robot 200. For example, signals between the OCU 100 and the robot 200 may be received and retransmitted by multiple repeaters 720 (in parallel and/or in series).

When the robot 200 enters a tunnel 30, if the repeater 720 is deployed at the entrance to the tunnel 30, as shown in FIG. 7C, it may maintain direct line-of-sight contact with both the robot 200 and the OCU 100. As a result, the robot 200 may drive relatively further into the tunnel 30 before communication is lost. In implementations in which the repeater 720 is a mobile robot 200, the repeater 720 may move around to improve connectivity range down the tunnel 30. Additionally or alternatively, one or more repeaters 720 may be positioned in a breadcrumb trail down the tunnel 30 to further extend connectivity to the robot 200.

In a similar way, the repeater 720 may improve the robot's performance in the investigation of buildings. Deployment of a repeater 720 in a doorway can increase a communications signal in the building. The repeater 720 may also improve the robot's performance over open ground. Assuming the repeater 720 has the same signal power as the OCU 100, deploying the repeater 720 at the edge of OCU 100 communication may effectively double a mission range of the robot 200.

In some implementations, the repeater 720 is a payload of the mobile robot 200. The robot 200 can carry the repeater 720 to a threshold distance $D_T$ or communication range between the OCU 100 and the robot 200, and then deploy the repeater 720 to increase that communication range. Additionally or alternatively, the robot 200 can carry one or more repeaters 720 and drop them as the robot 200 moves into a tunnel 30, a building, or behind an obstacle. The repeater 720 may be a mobile situation awareness robot 720a or a stationary communicator 720b. In the case of a mobile repeater robot 720a, after deployment, the repeater robot 720a may maneuver autonomously or semi-autonomously (e.g., by a remote operator) to a location between the OCU 100 and the robot 200 that provides adequate communication therebetween and optionally additional situational awareness (e.g., sensor data, video, and/or other imagery using its sensor system).

In example shown in FIG. 7B, first and second repeater robots $720a_1$, $720a_2$ deployed by the user or operator 10 or the robot 200 provide a relatively increased and/or redundant communication network 70 between the OCU 100 and the robot 200. If the first repeater robot $720a_1$ cannot repeat a transmission signal between the OCU 100 and the robot 200 (e.g., due to obstacles or obstructions) then the second repeater robot $720a_2$, if within range, can repeat the transmission signal between the OCU 100 and the robot 200. Moreover, both repeater robots $720a_1$, $720a_2$ can repeat the transmission signal between the OCU 100 and the robot 200, such that the OCU 100 and the robot 200 use the strongest signal and/or check for transmission errors.

In implementations in which the repeater 720 is a mobile robot 200 and more than one robot 200 are deployed in a location, each mobile robot 200 captures images of its surroundings and uploads the images to the cloud 22. The teleoperation software application 101 retrieves images from multiple robots 200 and stores the images in the cloud storage 24. The teleoperation software application 101 may analyze the images and send the analyzed data to each robot 200. The analyzed data includes an overall geography of the location generated from the images retrieved from the multiple robots 200. Therefore, each robot 200 senses its surroundings and the surroundings of other robots 200.

Figure 8A:
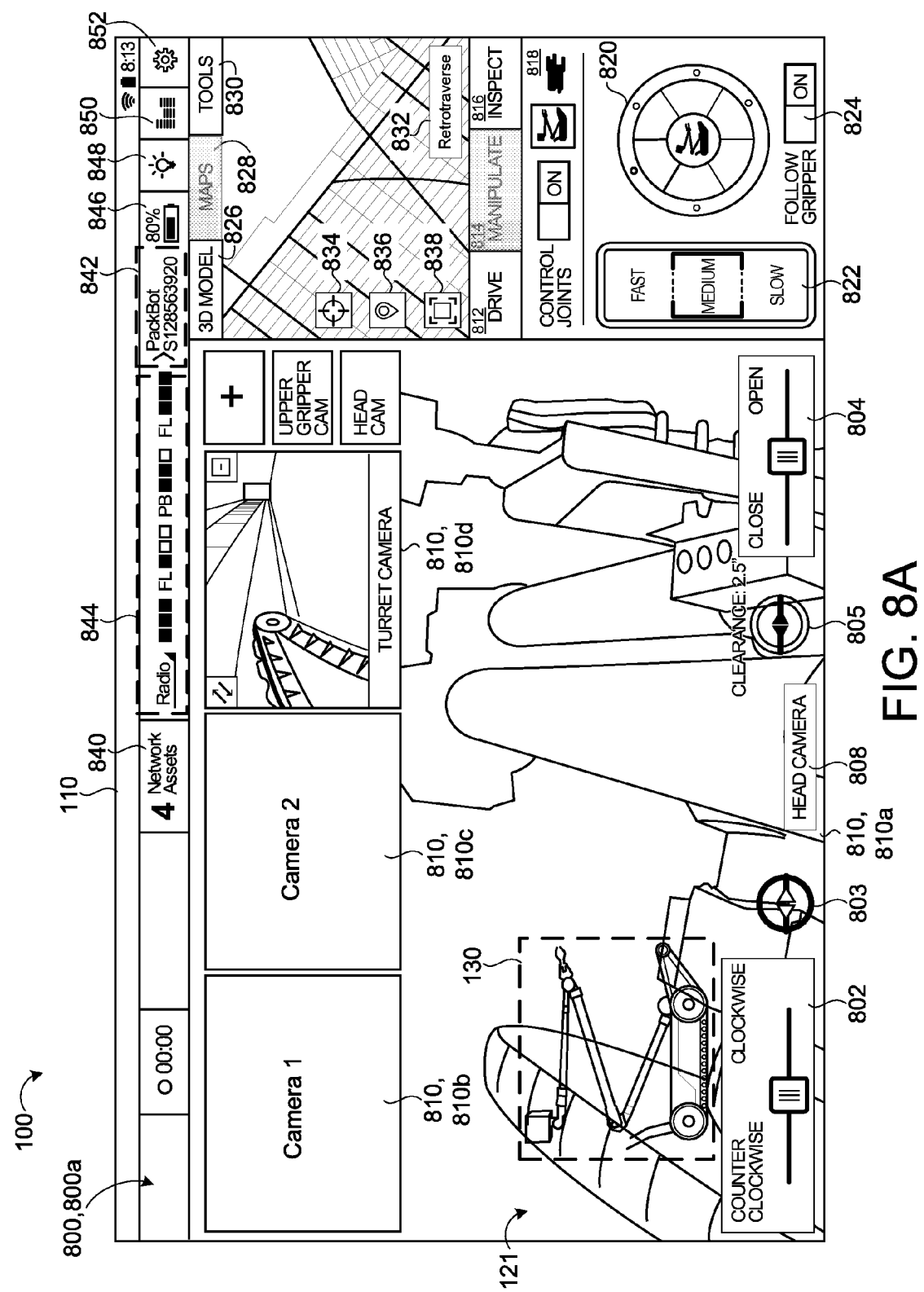
FIGS. 8A-8C are front views of exemplary operator control units (OCUs) displaying different views of the OCUs while controlling one or more robots.
Figure 8B:
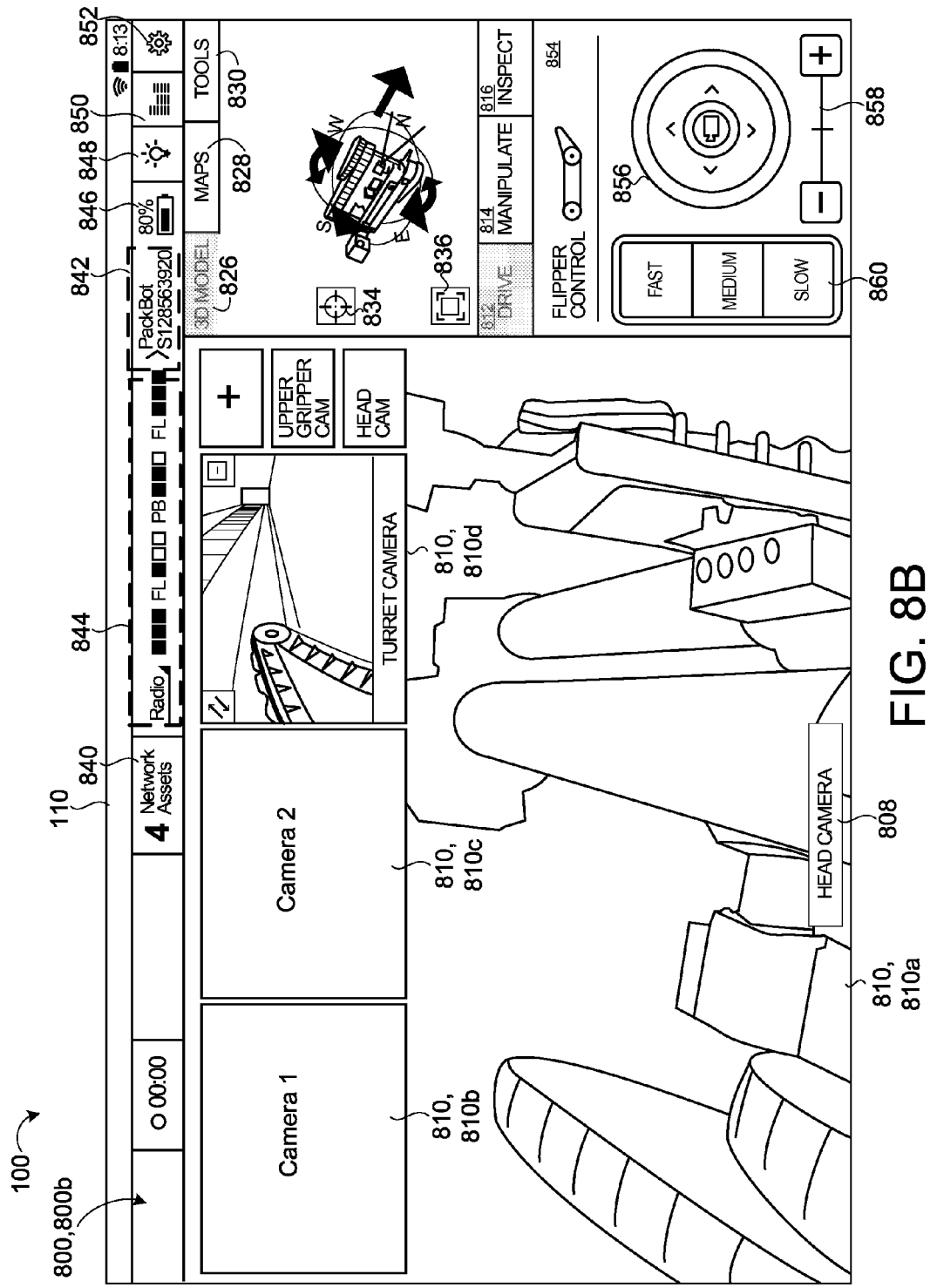
Figure 8C:
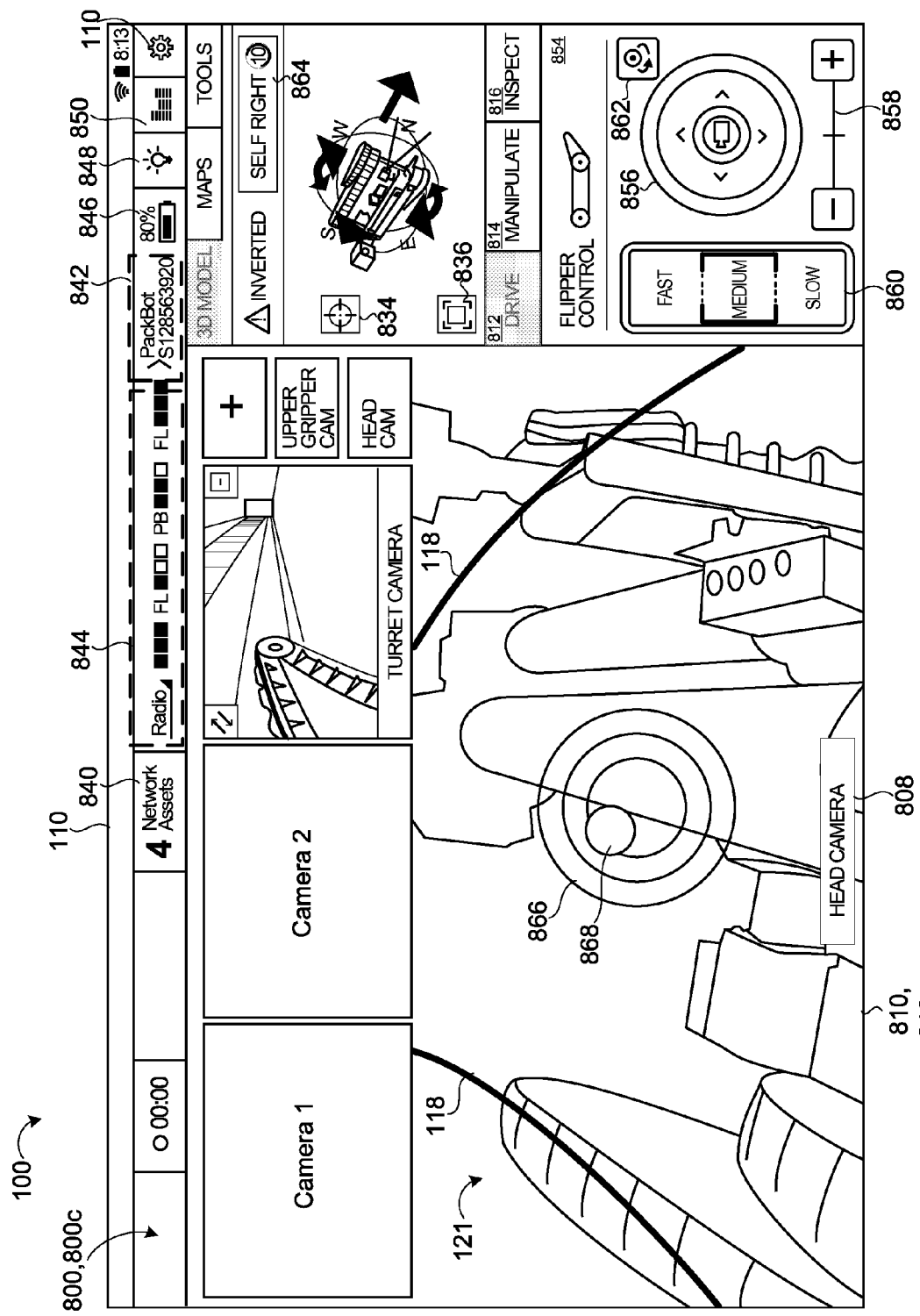

FIGS. 8A-8C illustrate an example OCU 100 for controlling one or more robots 200. The OCU 100 includes a touchscreen display 110. As shown, the OCU 100 is a touch screen tablet. The teleoperation software application 101 executing on the processor 102 of the OCU 100 provides a user interface 800, 800a-c that the processor 102 renders on the display 110 of the OCU 100 to allow a user 10 to control the robot 200 from a distance. The user interface 800 may include a clockwise/counter clockwise icon 802 that allows the user 10 to select how the gripper 270 rotates. In the example shown, the clockwise/counter clockwise icon 802 is a slider control, but other controls are possible as well, such as dials and levels. If the user 10 wants to rotate the gripper 270 in a clockwise direction, the user 10 may slide the slider 802 to the clockwise position. Similarly, if the user 10 wants to rotate the gripper 270 in a counterclockwise position, then the user 10 may slide the slider 802 to the counterclockwise position. A gripper feedback icon 803 provides visual feedback of the gripper position when the gripper 270 is rotating or rotated. As shown, the tongs 274a, 274b of the gripper 270 are in a vertical orientation with respect to the ground.

The user interface 800 may include an open/close gripper slider 804 that allows the user 10 to adjust a pinch distance between the tongs 274a, 274b of the gripper 270 to grip or release an object. A clearance icon 805 on the user interface 800 indicates the clearance distance or provides a quantitative value of how close the tongues 274a, 274b are together (e.g., a pinch separation distance). In some examples, the clearance icon 805 indicates a pressure being applied by the tongs 274a, 274b, when the tongs 274a, 274b are pinching each other or an object therebetween. The clearance icon 805 may turn different colors indicating a relative level or pressure or display a pressure or force value applied by the tongs 274a, 274b.

A current view icon 808 of the user interface 800 indicates a current camera view 810, 810a displayed on the display 110. The user interface 800 may include other camera views 810, 810b-d, from the same or from more than one robot 200. A user 10 may toggle between the multiple camera views 810, 810a-d, allowing the user 10 to control the one or more robots 200 from one OCU 100.

The user interface 800 may include a mode selection, such as but not limited to, a drive sub-menu 812, a manipulate sub-menu 814, and an inspect sub-menu 816. The user interface 800a of FIG. 8A shows the manipulate sub-menu 814, which includes control joints menu 818 allowing the user 10 to control one or more aspects of the joints of the robot joint 257. A camera selection dial 820 allows the user 10 to select which camera 218, 219, 262, 362 of the robot 200 to feed imagery for display in one or more camera views 810, 810a-d on the display 110. A speed controller 822 allows the user 10 to manipulate the speed of the arm 250 and/or the gripper 270. For example, the user 10 may increase or decrease the speed at which the gripper 270 grips an object. In some examples, the user 10 may select an option to camera-follow the gripper 824, where the OCU 100 and/or the robot 200 determines how to move the selected camera 218, 219, 262, 362 (or another camera) to follow and maintain a view of the gripper 270.

The user interface 800 also includes a view selection that includes a three-dimensional model view 826, a map view 828, and a tools view 830. FIG. 8A shows the map view 828, which includes a retrotraverse icon 832, allowing the robot 200 to traverse back from a location in a manner similar to the path it traversed to reach the location, when the robot 200 loses signal from the OCU 100. In addition, the map view 828 includes a current location icon 834, which allows the user 10 to view his/her current location, a waypoint icon 836 that allows the user 10 to place waypoints on the map view 828 and create a path for the robot 200 to traverse, and an expand button 838 that allows the user 10 to expand the map view 828 for better viewing.

In some examples, the user interface 800 includes a robot number indicator 840 indicating the number of other robots 200 connected to the network 20. The user 10 may select one of the identified other robots 200 to initiate control of that robot 200. The user interface 800 includes an identification number or a serial number 842 of the robot 200 currently connected to and being controlled by the OCU 100. In addition, the user interface 800 displays a signal strength status 844 of the connection of the current connected robot 110 to the OCU 100 and other communication nodes 720 or other robots 200. The signal strength status 844 also displays the other communication nodes 720 or other robots 200 in a communication relay order, if applicable. For example, if the OCU 100 identifies three other network assets on the network 20 that each relay communications from one to another in series, then the signal strength status 844 may display the order of that communication series. Additionally, the user interface 800 may display a battery indicator 846 indicating the battery life of the OCU 100, a volume controller 850 indicating the volume controls of the OCU 100, and a settings icon 852 that allows the user 10 to view other settings and personalize the display 110.

Referring to FIG. 8B, in some implementations, the user 10 selects the drive sub-menu 812 on the user interface 800b, which includes a flipper control menu 854 for controlling the flipper. The drive sub-menu 812 allows the user 10 to adjust the camera settings 856 and zoom in/out using a sliding bar 858. Moreover, the drive sub-menu 812 allows the user 10 to control the speed of the flippers 270, i.e., the robot 200 by using the speed buttons 860. The user 10 may rotate the camera 272 by pressing the rotate button 862. The three-dimensional view 826 shows a three-dimensional view of the robot 200. Referring to FIG. 8C, in some examples, if the robot 200 tilts and falls on its side, the user 10 may invoke a self-righting behavior by pressing the self-right icon 864 on the user interface 800c.

Referring to FIGS. 8A and 8C, in some implementations, the user interface 800 displays an augmented image 121 overlain on the video feed 120 in one or more of the camera views 810. The augmented image 121 includes a robot representation 130 overlain on the video feed view 120. The robot representation 130 includes user-selectable portions 132 (e.g., a pivot end representation 132a, a first arm portion representation 132b, a joint representation 132c, a second arm portion representation 132d, a gripper representation 132e, a robot body representation 132f, and a flipper 132g) (see FIGS. 4B-4I). In the example shown in FIG. 8C, the teleoperation software 101 displays drive lanes 118 on the current camera view 810a of the user interface 800 (or another view). The drive lanes 118 provide the user 10 with a better view of the drive trajectory of the robot 200. In addition, the user interface 800 may include a touch indicator 866 that provides visual feedback of the user 10 contacting the touch screen 110 and a touch movement indicator 868 showing the commanded touch movement of the user 10 relative to the initial touch, as received by the touch screen 110 (e.g., illustrating a swipe command) This visual feedback allows the user 10 to discern a general heading of the robot 200.

Figure 9:
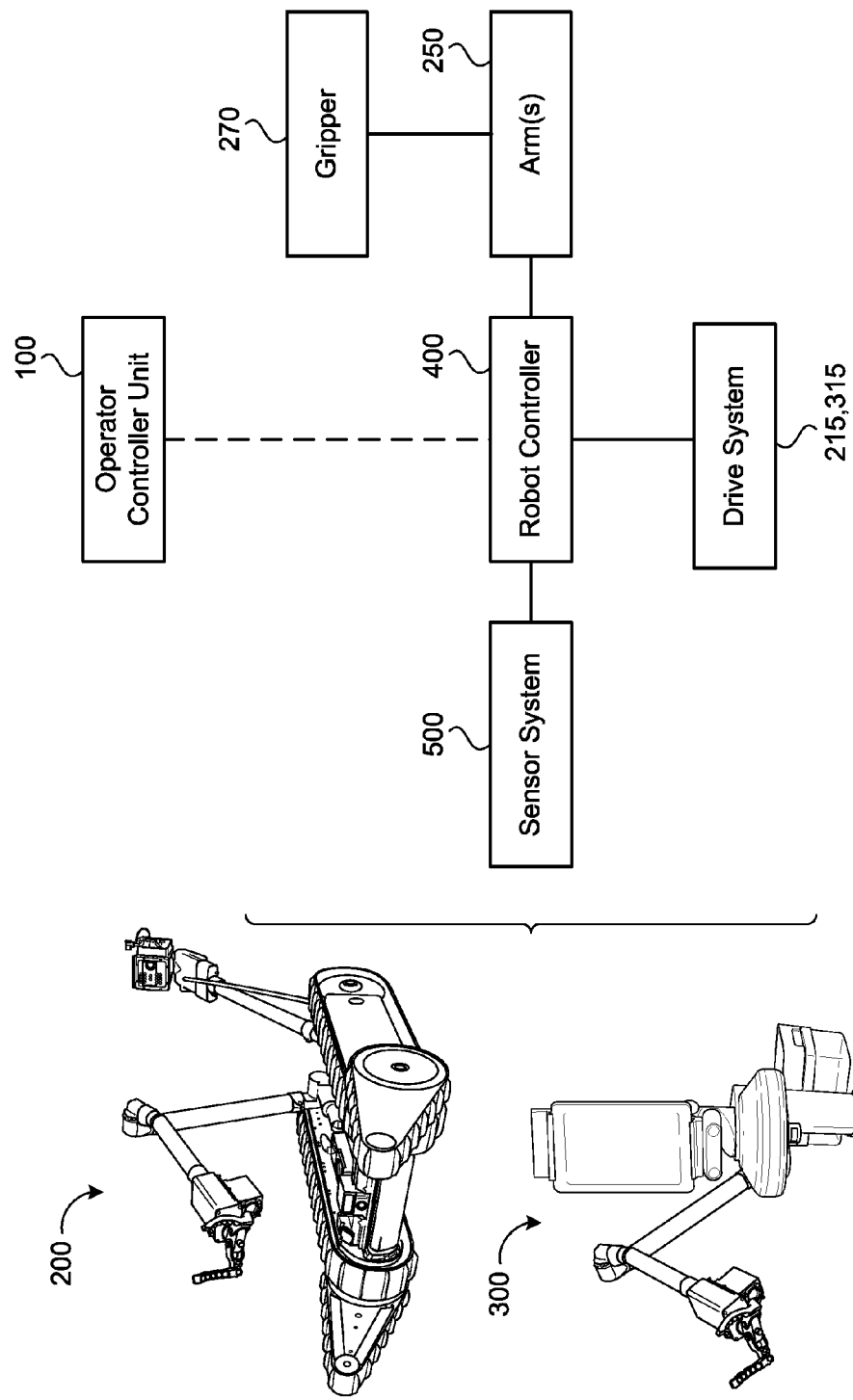
FIG. 9 is a schematic view of an exemplary robot.
Figure 10:
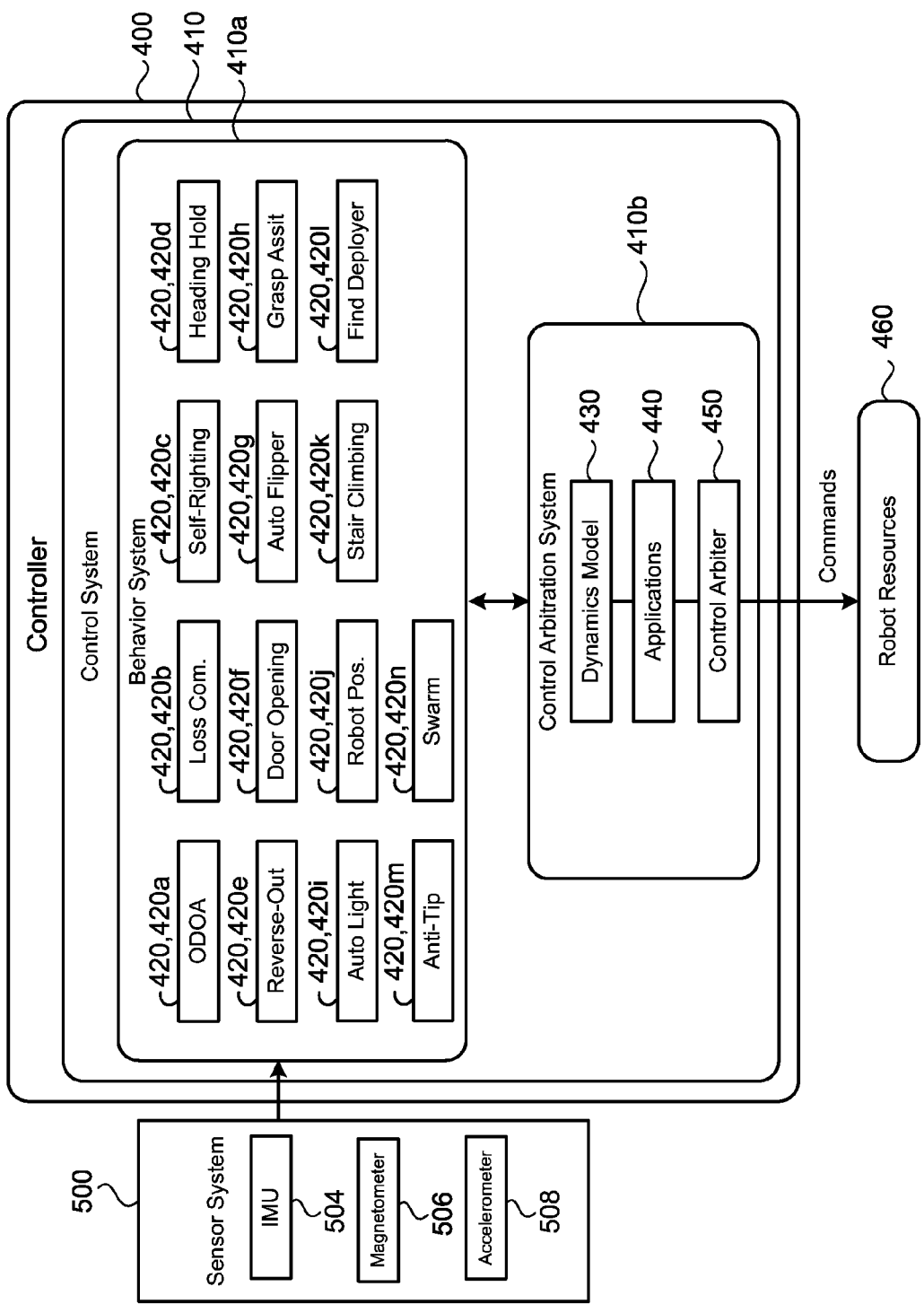
FIG. 10 is a schematic view of an exemplary robot control system.

Referring to FIGS. 9 and 10, to achieve reliable and robust autonomous movement, the sensor system 500 may include several different types of sensors, which can be used in conjunction with one another to create a perception of the robot's environment sufficient to allow the robot 200 to make intelligent decisions about actions to take in that environment. The sensor system 500 may include one or more types of sensors supported by the robot body 210, which may include obstacle detection obstacle avoidance (ODOA) sensors, communication sensors, navigation sensors, etc. For example, these sensors may include, but are not limited to, proximity sensors, contact sensors, three-dimensional (3D) imaging/depth map sensors, a camera (e.g., visible light, infrared camera and/or stereo camera), sonar, radar, LIDAR (Light Detection And Ranging, which can entail optical remote sensing that measures properties of scattered light to find range and/or other information of a distant target), LADAR (Laser Detection and Ranging), etc.

The sensor system 500 may include an inertial measurement unit (IMU) 504 in communication with the controller 400 to measure and monitor a moment of inertia of the robot 200 with respect to the overall center of gravity $CG_R$ of the robot 200. The controller 400 may monitor any deviation in feedback from the IMU 504 from a threshold signal corresponding to normal unencumbered operation. When accelerating from a stop, the controller 400 may take into account a moment of inertia of the robot 200 from its overall center of gravity $CG_R$ to prevent robot tipping. The controller 400 may use a model of its pose, including its current moment of inertia. When payloads are supported, the controller 400 may measure a load impact on the overall center of gravity $CG_R$ and monitor movement of the robot moment of inertia. If this is not possible, the controller 400 may apply a test torque command to the drive system 215 and measure actual linear and angular acceleration of the robot using the IMU 504, in order to experimentally determine limits.

The sensor system 500 may include a magnetometer 506 in communication with the controller 400 to measure the strength and direction of magnetic fields. The magnetometer 506 may be used as a compass. The magnetometer 506 may be a scalar magnetometer 506, which measures the total strength of the magnetic field that the robot 200 is subjected to, or vector magnetometers, which measures the component of the magnetic field in a particular direction, relative to the spatial orientation of the device.

In some examples, the sensor system 500 includes an accelerometer 508 in communication with the controller 400 to measure the proper acceleration of the robot 200. Proper acceleration is the physical acceleration that an object experiences and not necessarily the change of velocity (i.e., coordinate acceleration). The controller 400 may consider sensory data from one or more of the IMU 504, the magnetometer 506, or accelerometer 508.

In some implementations, the sensor system 500 includes an array of proximity sensors, one or more cameras 218, 219, 262 (e.g., stereo cameras, visible light camera, infrared camera, thermography, etc.), and/or one or more 3-D imaging sensors (e.g., volumetric point cloud imaging device) in communication with the controller 400 and arranged in one or more zones or portions of the robot 200 for detecting any nearby or intruding obstacles. The proximity sensors may be converging infrared (IR) emitter-sensor elements, sonar sensors, and/or ultrasonic sensors that provide a signal to the controller 400 when an object 114 is within a given range of the robot 200. If any of the sensors has a limited field of view, the controller 400 or the sensor system 500 can actuate the sensor in a side-to-side scanning manner to create a relatively wider field of view to perform robust ODOA.

In some implementations, reasoning or control software, executable on a processor (e.g., of the robot controller 400), uses a combination of algorithms executed using various data types generated by the sensor system 500. The reasoning software processes the data collected from the sensor system 500 and outputs data for making navigational decisions on where the robot 200 can move without colliding with an obstacle, for example. By accumulating imaging data over time of the robot's surroundings, the reasoning software can in turn apply effective methods to selected segments of the sensed image(s) to improve simultaneous localization and mapping (SLAM).

The reliability of executing robot collision free moves may be based on: (i) a confidence level built by high level reasoning over time; and (ii) a depth-perceptive sensor that accumulates three major types of data for analysis—(a) a depth image, (b) an active illumination image and (c) an ambient illumination image. Algorithms cognizant of the different types of data can be executed on each of the images obtained by the depth-perceptive imaging sensor. The aggregate data may improve the confidence level as compared to a system using only one of the kinds of data.

Referring to FIG. 10, in some implementations, the controller 400 (e.g., a device having one or more computing processors in communication with memory capable of storing instructions executable on the computing processor(s)) executes a control system 410, which includes a behavior system 410a and a control arbitration system 410b in communication with each other. The control arbitration system 410b allows robot applications 440 to be dynamically added and removed from the control system 410, and facilitates allowing applications 440 to each control the robot 200 without needing to know about any other applications 440. In other words, the control arbitration system 410b provides a simple prioritized control mechanism between applications 440 and resources 460 of the robot 200.

The applications 440 can be stored in memory of or communicated to the robot 200, to run concurrently on (e.g., on a processor) and simultaneously control the robot 200. The applications 440 may access behaviors 420 of the behavior system 410a. The independently deployed applications 440 are combined dynamically at runtime and to share robot resources 460 (e.g., drive system 215, arm(s) 250, head(s) 260 and/or gripper(s) 270) of the robot 200. A low-level policy is implemented for dynamically sharing the robot resources 460 among the applications 440 at run-time. The policy determines which application 440 has control of the robot resources 460 as required by that application 440 (e.g. a priority hierarchy among the applications 440). Applications 440 can start and stop dynamically and run completely independently of each other. The control system 410 also allows for complex behaviors 420 that can be combined together to assist each other. In some implementations, the OCU 100 displays a behavior option providing the user 10 the ability to select a behavior 420 that the controller 400 may implement.

The control arbitration system 410b includes one or more application(s) 440 in communication with a control arbiter 450. The control arbitration system 410b may include components that provide an interface to the control arbitration system 410b for the applications 440. Such components may abstract and encapsulate away the complexities of authentication, distributed resource control arbiters, command buffering, coordinate the prioritization of the applications 440 and the like. The control arbiter 450 receives commands from every application 440 and generates a single command based on the applications' priorities and publishes it for its associated resources 460. The control arbiter 450 receives state feedback from its associated resources 460 and may send it back up to the applications 440. The robot resources 460 may be a network of functional modules (e.g., actuators, drive systems, and groups thereof) with one or more hardware controllers. The commands of the control arbiter 450 are specific to the resource 460 to carry out specific actions.

A dynamics model 430 executable on the controller 400 is configured to compute the center for gravity (CG), moments of inertia, and cross products of inertial of various portions of the robot 200 for assessing a current robot state. With reference to the exemplary robot 200 shown in FIGS. 2A and 2B, the dynamics model 430 may be configured to calculate the center of gravity $CG_M$ of the main body 210, the center of gravity $CG_F$ of each flipper 230, the center of gravity $CG_A$ of each arm 250, the center of gravity $CG_H$ of each head 260, and/or the center of gravity $CG_R$ of the entire robot 200. The dynamics model 430 may also model the shapes, weight, and/or moments of inertia of these components. In some examples, the dynamics model 430 communicates with the IMU 504 or portions of one (e.g., accelerometers and/or gyros) in communication with the controller 400 for calculating the various centers of gravity of the robot 200. The dynamics model 430 can be used by the controller 400, along with other programs or behaviors 420 to determine operating envelopes of the robot 200 and its components.

In some implementations, a behavior 420 is a plug-in component that provides a hierarchical, state-full evaluation function that couples sensory feedback from multiple sources, such as the sensor system 500, with a-priori limits and information into evaluation feedback on the allowable actions of the robot 200. Since the behaviors 420 are pluggable into the application 440 (e.g., residing inside or outside of the application 440), they can be removed and added without having to modify the application 440 or any other part of the control system 410. Each behavior 420 is a standalone policy. To make behaviors 420 more powerful, it is possible to attach the output of multiple behaviors 420 together into the input of another so that you can have complex combination functions. The behaviors 420 are intended to implement manageable portions of the total cognizance of the robot 200.

In the example shown, the behavior system 410a includes an obstacle detection/obstacle avoidance (ODOA) behavior 420a for determining responsive robot actions based on obstacles perceived by the sensor (e.g., turn away; turn around; stop before the obstacle, etc.). Another behavior 420 may include a loss communications behavior 420b for determining a drive path of the robot 200 during a loss of communication with a satellite for obtaining global positioning coordinates. The drive path can be determined using at least one of the inertial measurement unit 504, odometry, and dead reckoning. For the exemplary robot 200 shown in FIGS. 2A and 2B, a self-right behavior 420c can provide actions for self-righting the robot 200 upon detecting a roll-over. Possible actions include rotating the flippers 130 a continuous 360 degrees to cause the main body to flip 180 degrees. For either robot 200 shown, a heading hold behavior 420d provides an assistant behavior that allows the robot 200 to correct the heading of the driven robot 200. For example, if the robot 200 hits a rock, obstacle, or course variation while driving and veers off course, the heading hold behavior 420d can automatically correct the heading of the robot 200, allowing the robot 200 to maintain a drive direction issued by the user 10. The behavior system 410a may include one or more inspection behaviors. The inspection behavior(s) may influence execution of commands by the control arbitration system 410b based on sensor signals received from the sensor system 500 to identify and inspect electrical equipment, for example, or other hazardous items.

In some implementations, the behavior system 410a includes a reverse-out behavior 420e for determining a reverse path of the robot arm 250 and/or the arm effector 270 after the arm 250 and/or arm effector 270 attempted to reach an object 114. For example, when a user 10 manipulates the robot 200 to grab an object 114 under a table, the user 10 may make such a selection by selecting the object 114 on the display 110 (e.g., by touching the object 114 twice), which indicates that the robot arm 250 should reach to the object 114. While the robot arm 200 moves toward the object, the controller 400 uses inverse kinematics equations to determine the joint configuration of the arm 250 to achieve the desired pose of the arm 250, i.e., reaching and grabbing the object 114 from beneath the table. After the robot 200 retrieves the object 114, the controller 400 executes the reverse-out behavior 410e, which retracts the robot arm 250 from the position of grabbing the object 114 along the same three-dimensional path it moved to retrieve the object 114. In some examples, the controller 400 receives an indication of a selection of the reverse-out behavior 420e and executed the reverse-out behavior 420e. The reverse-out behavior 420e determines at least one reverse-movement parameter of the at least one movable portion (see FIGS. 4B-4I) of the robot 200 using inverse kinematics to move the at least one movable portion of the robot 200 in an opposite direction along a path moved according to the issued command, and commands the at least one movable portion of the robot 200 based on the at least one reverse-movement movement parameter.

The behavior system 410a may include a door opening behavior 420f for opening a door; allowing the robot 200 to navigate freely in a space having closed doors and allowing the robot 200 navigate a space behind a closed door. Therefore, the door opening behavior 420f instructs the robot 200 to manipulate its environment to allow the robot 200 to not be constrained to a closed floor/space 17 and gain access to new floor/spaces 17 by opening doors. When the controller 400 executes the door opening behavior 420f, the controller 400 determines a position of a door handle and a type of the door handle positioned on the door; and based on the type of door handle, the controller 400 executes the door opening behavior 420f, which manipulates the arm 250 and gripper 270 in such a way as to open the door. The door handle may be any mechanism to open/close a door, such as but not limited to, a door knob, a lever-style door handle, a commercial duty lever door handle, a flush pull handle (for sliding doors), or a push bar handle.

The behavior system 410a may include an auto-flipper behavior 420g that prevents the robot 200 from flipping due to movement of the arm 250. For example, when the user 10 instructs the robot 200 to reach for an object, the controller 400 determines a predicted movement of the center-of-gravity $CG_R$ of the robot 200 due to a movement of the arm 250 needed to reach and grasp the object. When the object is too far away, such that only moving the arm 250 would cause the center-of-gravity $CG_R$ of the robot 200 to move beyond a stable volume of operating space, the auto-flipper behavior 420g causes the robot 200 to move the flippers 230a, 230b to a bracing position against a ground supporting surface, which increases the stable volume of operating space of the center-of-gravity $CG_R$ of the robot 200 and allows the arm 250 to reach further and grasp the object with the gripper 270 while still maintaining a stable robot pose. In additional examples, the auto-flipper behavior 420g moves the flippers 230a, 230b to a stair ascending position or another position to achieve a mobility goal.

A grasp assistance behavior 420h may determine a size and shape of an object 114 and manipulate the gripper 270 to grip the object 114 in a manner necessary to retrieve and maintain a grasp of the object. The grasp assistance behavior 420h may use one more sensors of the robot 200 to assess the nature of the object.

The behavior system 410a may include an auto light behavior 420i, which determines if the robot 200 is located in a dark room (e.g., based on a light sensor reading) and turns on a light disposed on the robot when the robot 200 determines that it is in a dark area. In some examples, the controller 400 also determines when there is light surrounding the robot 200 and turns the robot light off.

The behavior system 410a may include a robot positioning behavior 420j that repositions the robot 200 with respect to an object. When the robot 200 is approaching an object from a first direction or in a first approach position, the robot positioning behavior 420j may, in response to a received desired approach direction or approach position, cause the controller 400 to issue a command to autonomously drive the robot to approach the object from the desired approach direction or approach position with respect to the object. This also allows the robot 200 to carefully observe the object from multiple angles. In some examples, the user 10 may select an angle at which he/she wants to view the robot 200 approach the object. The controller 400 uses its sensor system 500, such as the IMU 504, and odometry to determine the robot repositioning commands.

The behavior system 410a may include a stair climbing behavior 420k that causes or assists the robot 200 to climb stairs. The stair climbing behavior 420k automatically adjusts the center-of-gravity $CG_R$ of the robot 200 to climb the stairs.

The behavior system 410a may include a find developer behavior 420l. A find deployer behavior 420l allows the repeater robot 500a to find its deployer, such as the operator 10 or the robot 200 that carried the repeater robot 500a as a payload. Execution of the find deployer behavior 420l by the behavior system 410a may cause execution of commands that ascertain imagery (such as a 3D volumetric point cloud) and/or video of the surrounding environment using the imaging sensor 518, identifying a deployer (e.g., using image recognition), and then orienting the repeater robot 500a to capture the deployer in a field of view of the imaging sensor 518. The find deployer behavior 420l may continue to reorient the repeater robot 720a to maintain the deployer in the field of view of the imaging sensor 518.

The behavior system 410a may include am anti-tip behavior 420m that receives inertial measurement signals from the IMU 504 of the robot 200 and determines a location of a center of gravity $CG_R$ of the robot 200. When the location of the center of gravity $CG_R$ of the robot 200 moves outside a stable volume of space, the anti-tip behavior 420m commands deployment of an appendage 230, 250 of the robot 200 to alter the location of the center of gravity CG of the robot 200 or brace the robot 200 against a supporting surface to prevent tipping of the robot 200.

The behavior system 410a may include a swarm behavior 420n, which allows the user 10 to set points on a map displayed on the OCU 100, each point indicative of a location that the user 10 wants the one or more robots 200 to position a repeater 720 (which may be a robot 200). The swarm behavior 420n assists the user 10 in setting up a communication network 20, where all the robots 200 communicate with a repeater 720 or another robot 200 in a networked arrangement. The order of operations of setting up the communication network 20 can be based on the order of location input from the user 10.

Figure 11:
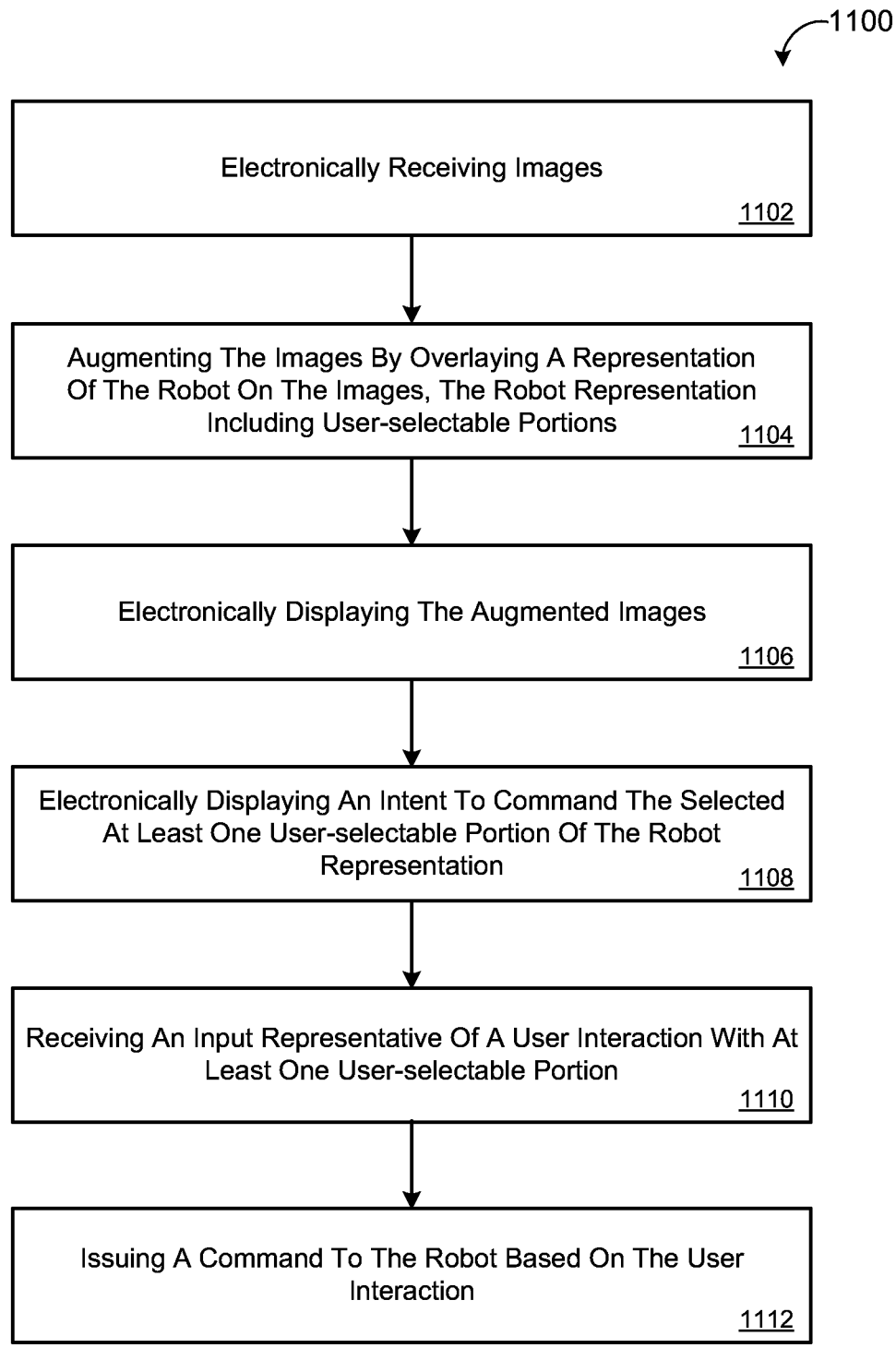
FIG. 11 provides an exemplary arrangement of operations for a method of operating a mobile robot.

FIG. 11 provides an exemplary method 1100 of operating a robot 200. The method 1100 includes electronically 1102 receiving images 120 captures by an imaging device (e.g., camera 218, 219, 262, 272) disposed on the robot 200, or by an imaging device in the vicinity of the robot 200. The method 1100 further includes augmenting 1104 the images by overlaying a representation of the robot 130 on the images 120, where the robot representation 130 includes user-selectable portions 132. The method 1100 further includes electronically displaying 1106 the augmented images 121 and electronically displaying 1108 an intent to command the selected user-selectable portion 132, 134 of the robot representation 130 by modifying an appearance of the representation of the robot 200 (highlighting the user-selectable portions, e.g., see FIGS. 4B-I). The method 1100 further includes receiving 1110 an input representation of a user interaction with at least one user-selectable portion 132 and issuing 1112 a command (e.g., a drive command, a turn command, etc.) to the robot 200 based on the user interaction.

In some implementations, a representation of the robot 130 includes at least one of a representation 132f of a robot body 210, a representation 132e of a gripper 270, or a representation of a link 132b,d or an actuator 132a,c. The method 1100 may include receiving the input representative of the user interaction from a touch display 110. The input includes at least one of a linear finger swipe, a curved finger swipe, a multi-finger swipe, a multi-finger gesture, a tap, or a prolonged press as shown with respect to FIGS. 4A-4M.

In some implementations, the method 1100 includes receiving an input representative of the user interaction with at least one user-selectable portion 132 of the robot representation 130. The method 1100 further includes receiving a first input representative of a selection of a displayed object 114 and receiving a second input representative of a selection of a robot behavior 420 that is associated with the object 114. Additionally or alternatively, the robot behavior 420 includes navigating the robot 200 towards the object 114. In some examples, the robot behavior 420 includes grasping the object 114 with a manipulator 250, 270 of the robot 200. The method 1100 may include receiving an indication of a selection of an alternate approach direction. In response to the indication, the robot behavior determines a drive path using odometry and/or inertial measurement signals from the IMU 504 of the robot 200 to navigate the robot 200 from a current location and a current approach direction to approach the object from the alternate approach direction, such as approaching the object from a different approach angle that an original approach. The method 1100 may further include identifying in the images a plane of a ground surface 17 supporting the robot 200 and a location of the object 114 with respect to the ground surface plane 17.

In some examples, the method 1100 further includes receiving an indication of a selection of a reverse-out behavior 420e and executing the reverse-out behavior 420e. The reverse-out behavior 420e determines at least one reverse-movement parameter of the at least one movable portion of the robot 200 using inverse kinematics to move the at least one movable portion of the robot 200 in an opposite direction along a path moved according to the issued command, and commands the at least one movable portion of the robot 200 based on the at least one reverse-movement movement parameter.

The method 1100 may further include receiving an indication of a selection of an anti-tip behavior 420m and executing the anti-tip behavior 420m. The anti-tip behavior 420m receives inertial measurement signals from an IMU 504 of the robot 200 and determines a location of a center of gravity $CG_R$ of the robot 200. When the location of the center of gravity $CG_R$ of the robot 200 moves outside a stable volume of space, the anti-tip behavior 420m commands deployment of an appendage 230 (e.g., a flipper 230 or arm 250) of the robot 200 to alter the location of the center of gravity CG of the robot 200 or brace the robot 200 against a supporting surface 17 to prevent tipping of the robot 200.

In some implementations, the method 1100 includes providing haptic feedback in response to the received input. The method 1100 may also include issuing a negative feedback response when the determined at least one movement parameter of the at least one movable portion of the robot 200 based on the received input violates a movement policy or is unexecutable. The negative feedback response includes at least one of the haptic feedback response, an audio feedback response, or a visual feedback response. The visual feedback response includes displaying an indicator at or near any portions of the robot 200 representation corresponding to any unmovable portions of the robot 200 based on the received input.

Figure 12:
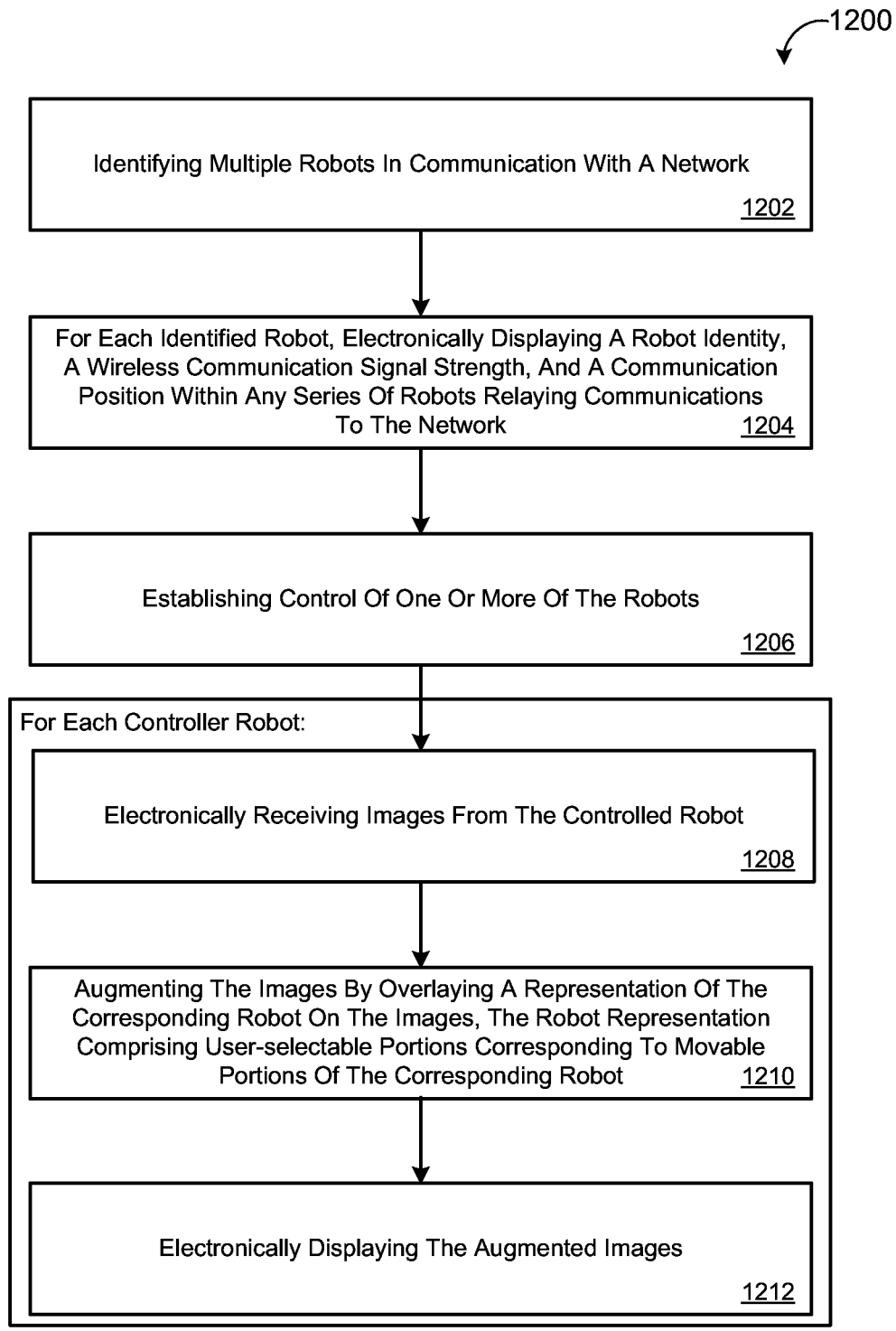
FIG. 12 provides an exemplary arrangement of operations for a method of operating multiple mobile robots.

FIG. 12 provides an exemplary method 1200 of operating multiple robots 200. The method 1200 includes identifying 1202 multiple robots 200 in communication with a network 20 and for each identified robot 200, electronically displaying 1204 a robot 200 identity 842, a wireless communication signal strength 844, and a communication position within any series of robots 200 relaying communications to the network 20. The method 1200 further includes establishing 1206 control of one or more of the robots 200, and for each controlled robot 200: electronically 1208 receiving images 120 from the controlled robot 200; augmenting 1210 the images 120 by overlaying a representation of the corresponding robot 130 on the images 120; and electronically displaying 1212 the augmented images 121. The robot 200 representation includes user-selectable portions 132 corresponding to movable portions of the corresponding robot 200.

In some implementations, for at least one controlled robot 200, the method 1200 includes receiving an indication of a selection of at least one user-selectable portion 132 of the corresponding robot 200 representation of the at least one controlled robot 200, electronically displaying an intent to command the selected at least one user-selectable portion 132 of the corresponding robot representation 130, and receiving an input representative of a user interaction with at least one user-selectable portion 132. For at least the one controlled robot, the method 1200 also includes determining at least one movement parameter of at least one movable portion of the corresponding robot 200 using inverse kinematics based on the received input and issuing a command to the corresponding robot 200 based on the at least one movement parameter. The representation of the at least one controlled robot 200 includes at least one of a representation 130 of a vehicle body, a representation of a gripper, a representation of a link, or a representation of an actuator. Electronically displaying the intent to command the selected at least one user-selectable robot representation portion 132 includes modifying an appearance of the robot representation 132. In some examples, the input representative of the user interaction is received from a touch display 110 (e.g., of the OCU 100) and includes at least one of a linear finger swipe, a curved finger swipe, a multi-finger swipe, a multi-finger gesture, a tap, or a prolonged press.

In some implementations, receiving the input representative of the user interaction with at least one user-selectable portion 132 includes receiving a first input representative of a selection of a displayed object and receiving a second input representative of a selection of a robot behavior 420. The robot behavior 420 may be associated with the object. The robot behavior 420 may include navigating the at least one controlled robot towards the object. The method 1200 also includes receiving an indication of a selection of an alternate approach direction. The robot behavior 420, 420*j* determines a drive path using odometry and/or inertial measurement signals from the IMU 504 of the robot 200 to navigate the at least one controlled robot 200 from a current location and a current approach direction to approach the object from the alternate approach direction. The robot behavior 420, 420*j* may include grasping the object with a manipulator of the robot 200. In some examples, the method 1200 includes identifying in the images 120 a plane of a ground surface supporting the at least one controlled robot 200 and a location of the object with respect to the ground surface plane 17.

In some implementations, the method 1200 further includes receiving an indication of a selection of a reverse-out behavior 420*e*, and executing the reverse-out behavior 420*e*. The reverse-out behavior 420*e* determines at least one reverse-movement parameter of the at least one movable portion of the robot using inverse kinematics to move the at least one movable portion of the at least one controlled robot 200 in an opposite direction along a path moved according to the issued command, and commands the at least one movable portion of the at least one controlled robot 200 based on the at least one reverse-movement movement parameter.

The method 1200 may include providing haptic feedback in response to the received input. In some examples, the method 1200 includes issuing a negative feedback response when the determined at least one movement parameter of the at least one movable portion of the robot 200 based on the received input violates a movement policy or is unexecutable. The negative feedback response includes at least one of the haptic feedback response, an audio feedback response, or a visual feedback response. The visual feedback response includes displaying an indicator at or near any portions 132 of the robot representation 130 corresponding to any unmovable portions of the robot 200 based on the received input.

In some implementations, the method 1200 further includes receiving an indication of a selection of a series of robots 200 in communication with the network 20 and an order of deployment of a communication repeater 720 deployment carried by each of the selected robots 200, and issuing repeater deployment instructions to each of the selected robots 200. Each repeater instruction indicates a repeater deployment order of the corresponding robot 200 with respect to the other selected robots 200. Moreover, each selected robot 200 deploys its carried communication repeater 720 when the robot 200 maneuvers to or near an edge of a wireless communications reception area of the network 20. Each repeater instruction may include a repeater deployment location. The method 1200 may further include communicating with and using a remote scalable computing resource 22 to execute commands demanding a threshold computing capacity.

Although various implementations may be discussed, the robot 200 and methods of operating the robot 200 may apply to any environment or building in need of environmental monitoring (e.g., air quality control). For example, the robot 200 may operate in any environment or building needing monitoring of environmental factors for compliance to a standard, for operational reasons or for satisfying a customer delivery. For heating ventilation and cooling (HVAC) installations, the robot 200 may be used to monitor and/or check the temperature, humidity, and/or air flow distribution in a building, for example, before hand-over to a customer. Hospitals may use the robot 200 to monitor and maintain environmental factors, such as air quality, for patient comfort and safety. The robot 200 may monitor clean rooms for measuring/mapping air flow and particulate levels, food storage rooms for measuring/mapping temperature and/or contamination, basements for measuring/mapping carbon monoxide and/or radon, nuclear power plants for measuring/mapping radiation levels, and other environments.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
    identifying multiple robots in communication with a network;
    for each identified robot, electronically displaying a robot identity, a wireless communication signal strength, and a communication position within any series of robots relaying communications to the network;
    establishing control of one or more of the robots; and
    for each controlled robot:
        electronically receiving images from the one or more controlled robots;
        augmenting the images by overlaying a representation of the corresponding robot on the images, the robot representation comprising user-selectable portions corresponding to movable portions of the corresponding robot; and
        electronically displaying the augmented images.

2. The method of claim 1, further comprising, for at least one controlled robot:
    receiving an indication of a selection of at least one user-selectable portion of the corresponding robot representation of the at least one controlled robot;
    electronically displaying an intent to command the selected at least one user-selectable portion of the corresponding robot representation;
    receiving an input representative of a user interaction with at least one user-selectable portion;
    determining at least one movement parameter of at least one movable portion of the corresponding robot using inverse kinematics based on the received input; and
    issuing a command to the corresponding robot based on the at least one movement parameter.

3. The method of claim 2, wherein the representation of the at least one controlled robot comprises at least one of a representation of a vehicle body, a representation of a gripper, a representation of a link, or a representation of an actuator.

4. The method of claim 3, wherein electronically displaying the intent to command the selected at least one user-selectable robot representation portion comprises modifying an appearance of the robot representation.

5. The method of claim 2, wherein the input representative of the user interaction is received from a touch display and comprises at least one of a linear finger swipe, a curved finger swipe, a multi-finger swipe, a multi-finger gesture, a tap, or a prolonged press.

6. The method of claim 2, wherein receiving the input representative of the user interaction with at least one user-selectable portion comprises:
    receiving a first input representative of a selection of a displayed object; and
    receiving a second input representative of a selection of a robot behavior, the robot behavior associated with the object.

7. The method of claim 6, wherein the robot behavior comprises navigating the at least one controlled robot towards the object.

8. The method of claim 7, further comprising receiving an indication of a selection of an alternate approach direction, the robot behavior determining a drive path using odometry and/or inertial measurement signals from an inertial measurement unit of the robot to navigate the at least one controlled robot from a current location and a current approach direction to approach the object from the alternate approach direction.

9. The method of claim 7, wherein the robot behavior comprises grasping the object with a manipulator of the robot.

10. The method of claim 6, further comprising identifying in the images a plane of a ground surface supporting the at least one controlled robot and a location of the object with respect to the ground surface plane.

11. The method of claim 2, further comprising:
receiving an indication of a selection of a reverse-out behavior; and
executing the reverse-out behavior, the reverse-out behavior:
  determining at least one reverse-movement parameter of the at least one movable portion of the robot using inverse kinematics to move the at least one movable portion of the at least one controlled robot in an opposite direction along a path moved according to the issued command; and
  commanding the at least one movable portion of the at least one controlled robot based on the at least one reverse-movement movement parameter.

12. The method of claim 2, further comprising providing haptic feedback in response to the received input.

13. The method of claim 2, further comprising, when the determined at least one movement parameter of the at least one movable portion of the robot based on the received input violates a movement policy or is unexecutable, issuing a negative feedback response.

14. The method of claim 13, wherein the negative feedback response comprises at least one of a haptic feedback response, an audio feedback response, or a visual feedback response, the visual feedback response comprising displaying an indicator at or near any portions of the robot representation corresponding to any unmovable portions of the robot based on the received input.

15. The method of claim 2, further comprising:
receiving an indication of a selection of a series of robots in communication with the network and an order of deployment of a communication repeater deployment carried by each of the selected robots; and
issuing repeater deployment instructions to each of the selected robots, each repeater instruction indicating a repeater deployment order of the corresponding robot with respect to the other selected robots, each selected robot deploying its carried communication repeater when the robot maneuvers to or near an edge of a wireless communications reception area of the network.

16. The method of claim 15, wherein each repeater instruction includes a repeater deployment location.

17. The method of claim 2, further comprising communicating with and using a remote scalable computing resource to execute commands demanding a threshold computing capacity.

18. A system comprising:
a network;
multiple robots in wireless communication with the network; and
multiple operator control units in communication with the network, each operator controller unit comprising:
  a screen; and
  a processor in communication with the screen, the processor configured to:
    identify the multiple robots in communication with the network;
    for each identified robot, electronically display a robot identity, a wireless communication signal strength, and a communication position within any series of robots relaying communications to the network;
    establish control of one or more of the robots; and
    for each controlled robot:
      electronically receive images from the controlled robot;
      augment the images by overlaying a representation of the corresponding robot on the images, the robot representation comprising user-selectable portions corresponding to movable portions of the corresponding robot; and
      electronically display the augmented images.

19. The system of claim 18, wherein the processor is configured to, for at least one controlled robot:
receive an indication of a selection of at least one user-selectable portion of the corresponding robot representation of the at least one controlled robot;
electronically display an intent to command the selected at least one user-selectable portion of the corresponding robot representation;
receive an input representative of a user interaction with at least one user-selectable portion;
determine at least one movement parameter of at least one movable portion of the corresponding robot using inverse kinematics based on the received input; and
issue a command to the corresponding robot based on the at least one movement parameter.

20. The method of claim 19, wherein the representation of the at least one controlled robot comprises at least one of a representation of a vehicle body, a representation of a gripper, a representation of a link, or a representation of an actuator.

21. The method of claim 20, wherein electronically displaying the intent to command the selected at least one user-selectable robot representation portion comprises modifying an appearance of the robot representation.

22. The method of claim 19, wherein the input representative of the user interaction is received from a touch display and comprises at least one of a linear finger swipe, a curved finger swipe, a multi-finger swipe, a multi-finger gesture, a tap, or a prolonged press.

* * * * *